(12) United States Patent
Tochigi et al.

(10) Patent No.: US 7,151,637 B2
(45) Date of Patent: Dec. 19, 2006

(54) ZOOM LENS AND A CAMERA PROVIDING THE SAME

(75) Inventors: Akiyoshi Tochigi, Tokyo (JP); Masaru Morooka, Tokyo (JP); Masashi Hankawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 90 days.

(21) Appl. No.: 11/017,755

(22) Filed: Dec. 22, 2004

(65) Prior Publication Data

US 2005/0162751 A1   Jul. 28, 2005

(30) Foreign Application Priority Data

Dec. 26, 2003   (JP) .............................. 2003-433382

(51) Int. Cl.
  *G02B 15/14*   (2006.01)
  *H04N 5/262*   (2006.01)

(52) U.S. Cl. .................................... 359/685; 348/240.3

(58) Field of Classification Search ............. 348/240.3; 359/683, 685, 686, 687
See application file for complete search history.

(56) References Cited

U.S. PATENT DOCUMENTS

| 6,404,561 B1 | 6/2002 | Isono et al. ................. 359/683 |
| 6,449,433 B1 | 9/2002 | Hagimori et al. ............. 396/72 |
| 2003/0165020 A1 | 9/2003 | Satori et al. ................ 359/686 |

*Primary Examiner*—David N. Spector
(74) *Attorney, Agent, or Firm*—Kenyon & Kenyon LLP

(57) ABSTRACT

A zoom lens system comprises, in order from an object side, positive, negative, positive, negative, and positive refractive power lens groups, and while changing the magnification, the distance between the first lens group and the second lens group increases, the distance between the second lens group and the third lens group decreases, the distance between the third lens group and the fifth lens group increases, and the second lens group moves more towards the object side at the telephoto end than the wide-angle end.

20 Claims, 9 Drawing Sheets

WIDE-ANGLE END

WIDE-ANGLE END

ZOOM LENS AND A CAMERA PROVIDING THE SAME

BACKGROUND OF THE INVENTION

1. Field of the Invention

The present invention relates to a zoom lens. In addition, the present invention relates to a camera that provides the same. In particular, the present invention relates to a zoom lens having a photographable angle of view equal to or greater than 70°, a brightness, and a high resolution that can be applied to a video camera, a digital camera, or the like. In addition, the present invention relates to a camera providing the same.

2. Description of Related Art

In recent years, a zoom lens having a total angle of view of about 60° at the wide-angle end and a zoom ratio of about 3 have dominated digital cameras for general users.

In contrast, in the case of digital cameras that target high-end users, a zoom lens is required having a focal length range from the wide-angle end to the telephoto end that is large, a high zoom ratio, and a large aperture. In addition, the pixel pitch of the digital camera becomes increasingly fine to attain a high resolution. Accompanying this, a high image quality is required in the zoom lens as well.

In response to these requirements, Japanese Unexamined Patent Application, First Publication, No. 2003-255228 (pages 9 to 16; FIGS. 1 to 4), for example, discloses a five-group zoom lens system, in which the refractive power of the lens group is, in order from the object side, a positive, negative, positive, negative, positive type, and in which the zoom ratio is from approximately 5 to 10 times.

However, the conventional zoom lens has the following problems.

In the technology disclosed in the above-cited document, the third lens group is configured including a simple positive lens and a cemented positive lens in which a negative lens and a positive lens are bonded together, and the diameter of the bundle of rays in proximity to the third lens group becomes large. Thus, the aberration that occurs at the third lens group easily becomes large. In addition, the refractive power of each of the lenses becomes strong, and the sensitivity to eccentricity between each of the lenses of the third lens group becomes high. In addition, when changing the magnification from the wide-angle end to telephoto end, the second lens group moves towards the object side, and thus the width of movement of the third lens group is limited. Thus, the refractive power of the third lens group must be made strong. In addition, the refractive power is concentrated in the positive lens on the object side, and thus the sensitivity to eccentricity becomes high. In addition, the fifth lens group is formed by a cemented lens, and thus the off-axial correction of aberration is not sufficient, and the image quality cannot be said to be high.

In consideration of the problems described above, it is an object of the present invention to provide a zoom lens having an advantageous aberration correction in response to high resolution, or a zoom lens having a small sensitivity to eccentricity and is easy to manufacture.

SUMMARY OF THE INVENTION

A first aspect of the present invention includes a zoom lens system including, in order from an object side to an image plane side thereof, a first lens group having positive refractive power,
a second lens group having negative refractive power,
a third lens group having positive refractive power,
a fourth lens group having negative refractive power, and
a fifth lens group having positive refractive power,
wherein:
all spaces between the lens groups are varied while changing magnification, and wherein,
the second lens group comprises only four lenses, these four lenses consist of, in order from the object side, a first negative lens, a second negative lens, a third negative lens, and a fourth positive lens,
the third lens group comprises only four lenses, these four lenses consist of, in order from the object side, a first positive lens, a second positive lens, a third negative lens, and a fourth positive lens.

A second aspect of the present invention includes a zoom lens system including, in order from an object side to an image plane side thereof, a first lens group having positive refractive power,
a second lens group having negative refractive power,
a third lens group having positive refractive power,
a fourth lens group having negative refractive power, and
a fifth lens group having positive refractive power,
wherein:
all spaces between the lens groups are varied while changing magnification, and wherein,
the third lens group comprises, in order from the object side:
a first positive lens having a curvature of an object side surface larger than a curvature of an image side surface,
a second meniscus positive lens having a object side surface concave to the object side, and
at least one negative lens.

A third aspect of the present invention includes a zoom lens system including, in order from an object side to an image plane side thereof, a first lens group having positive refractive power,
a second lens group having negative refractive power,
a third lens group having positive refractive power,
a fourth lens group having negative refractive power, and
a fifth lens group having positive refractive power,
wherein:
all spaces between the lens groups are varied while changing magnification, and wherein,
the fifth lens group comprises only two lenses, these two lenses consist of, in order from the object side, a positive lens, and a negative lens having an absolute of curvature of an object side surface larger than an absolute of curvature of an image side surface, and
the positive lens and the negative lens are separated.

A fourth aspect of the present invention includes the zoom lens system according to the first aspect, which satisfies the following conditions:

$$1 < d_{2it}/d_{2iw} < 1.6 \tag{21}$$

$$3mm < \{(d_{3t}+d_{4t})-(d_{3w}+d_{4w})\}/(f_t/f_w) < 6mm \tag{22}$$

where $d_{2iw}$ is a distance between an object side surface of the second lens group and an image plane at a wide-angle end, $d_{2it}$ is a distance between the object side surface of the second lens group and the image plane at a telephoto end, $d_{3w}$ is a spacing between the third lens group and the fourth lens group at a wide-angle end, $d_{3t}$ is a spacing between the third lens group and the fourth lens group at the telephoto end, $d_{4w}$ is a spacing between the fourth lens group and the fifth lens group at the wide-angle end, $d_{4t}$ is a spacing between the fourth lens group and the fifth lens group at the telephoto end, $f_t$ is a focal length of the zoom lens system at the telephoto end, and $f_w$ is a focal length of the zoom lens system at the wide-angle end.

A fifth aspect of the present invention provides a zoom lens system including, in order from an object side to an image plane side thereof:

a first lens group having positive refractive power,
a second lens group having negative refractive power,
a third lens group having positive refractive power,
a fourth lens group having negative refractive power, and
a fifth lens group having positive refractive power,
wherein the first lens group, the second lens group, and the third lens group are moved individually while changing the magnification of the zoom lens system from a wide-angle end to a telephoto end such that
a distance between the first lens group and the second lens group becomes wide,
a distance between the second lens group and the third lens group becomes narrow,
a distance between the third lens group and the fifth lens group becomes wide,
the second lens group moves in such a way as to arrive at the object side of the zoom lens system at the telephoto end rather than at a wide-angle end, and
wherein the zoom lens system satisfies the following conditions:

$$1 < d_{2it}/d_{2iw} < 1.6 \quad (21)$$

$$3mm < \{(d_{3t}+d_{4t})-(d_{3w}+d_{4w})\}/(f_t/f_w) < 6mm \quad (22)$$

where $d_{2iw}$ is a distance between an object side surface of the second lens group and an image plane at a wide-angle end, $d_{2it}$ is a distance between the object side surface of the second lens group and the image plane at a telephoto end, $d_{3w}$ is a spacing between the third lens group and the fourth lens group at a wide-angle end, $d_{3t}$ is a spacing between the third lens group and the fourth lens group at the telephoto end, $d_{4w}$ is a spacing between the fourth lens group and the fifth lens group at the wide-angle end, $d_{4t}$ is a spacing between the fourth lens group and the fifth lens group at the telephoto end, $f_t$ is a focal length of the zoom lens system at the telephoto end, and $f_w$ is a focal length of the zoom lens system at the wide-angle end.

A sixth aspect of the present invention is the zoom lens system according to the fifth aspect, wherein the zoom lens system includes five lens groups in total.

A seventh aspect of the present invention is the zoom lens system according to the fifth or sixth aspects, wherein the fourth lens group and the fifth lens group are moved individually while changing the magnification of the zoom lens system from the wide-angle end to the telephoto end.

An eighth aspect of the present invention is the zoom lens system according to the fifth or sixth aspects, wherein the second lens group comprises only four lenses, these four lenses consist of, in order from the object side, a first negative lens, a second negative lens, a third negative lens, and a fourth positive lens.

A ninth aspect if the present invention is the zoom lens system according to the fifth or sixth aspects, wherein the third lens group comprises, in order from the object side:

a first positive lens having an absolute of curvature of an object side surface larger than an absolute of curvature of an image side surface, a second meniscus positive lens having a object side surface concave to the object side, and at least one negative lens.

A tenth aspect of the present invention is the zoom lens system according to the fifth or sixth aspects, wherein the third lens group comprises only four lenses, these four lenses consist of, in order from the object side, a first positive lens, a second positive lens, a third negative lens, and a fourth positive lens.

An eleventh aspect of the present invention is the zoom lens system according to the fifth or sixth aspects, wherein the fifth lens group comprises, in order from the object side:

a positive lens, and a negative lens having an absolute of curvature of an object side surface larger than an absolute of curvature of an image side surface, and the positive lens and the negative lens in the fifth lens group are separated.

A twelfth aspect of the present invention is the zoom lens system according to the eighth aspect, wherein the second lens group has at least one aspheric surface.

A thirteenth aspect of the present invention is the zoom lens system according to the first aspect, wherein the second lens group has at least one aspheric surface.

A fourteenth aspect of the present invention is the zoom lens system according to the first or second aspects, wherein:

the first positive lens in the third lens group is positive meniscus lens having a convex surface convex to the object side, and the first positive lens has at least one aspheric surface.

A fifteenth aspect of the present invention is the zoom lens system according to the first, second, third, or fifth aspects, wherein focusing is performed by moving the fifth lens group along an optical axis.

A sixteenth aspect of the present invention is the zoom lens system according to the first, second, third, or fifth aspects, wherein:

an image side surface of the fourth lens group is a concave surface concave to the image plane side, an object side surface of the fifth lens group is a convex surface convex to the object side, and wherein the zoom lens system satisfies the following conditions:

$$|IH/r_{4r}| < 0.35 \quad (15)$$

$$|IH/r_{5f}| < 0.5 \quad (16)$$

where $r_{4r}$ is a radius of curvature on the image side surface of the fourth lens group, $r_{5f}$ is a radius of curvature on the object side surface of the fifth lens group, and IH is a maximum image height.

A seventeenth aspect of the present invention is a camera including a zoom lens system and an image pick up device disposed at the image plane position of the zoom lens system, wherein the zoom lens system comprises, in order from an object side to an image plane side thereof:

a first lens group having positive refractive power,
a second lens group having negative refractive power,
a third lens group having positive refractive power,
a fourth lens group having negative refractive power, and
a fifth lens group having positive refractive power,
  wherein:
all spaces between the lens groups are varied while changing magnification, and wherein,
the second lens group comprises only four lenses, these four lenses consist of, in order from the object side, a first negative lens, a second negative lens, a third negative lens, and a fourth positive lens,
the third lens group comprises only four lenses, these four lenses consist of, in order from the object side, a first positive lens, a second positive lens, a third negative lens, and a fourth positive lens.

An eighteenth aspect of the present invention is a camera including a zoom lens system and an image pick up device arranged image plane position of the zoom lens system, wherein the zoom lens system comprises, in order from an object side to an image plane side thereof:
a first lens group having positive refractive power,
a second lens group having negative refractive power,
a third lens group having positive refractive power,
a fourth lens group having negative refractive power, and
a fifth lens group having positive refractive power,
  wherein:
all spaces between the lens groups are varied while changing magnification, and wherein,
the third lens group comprises, in order from the object side:
a first positive lens having an absolute of curvature of an object side surface larger than an absolute of curvature of an image side surface,
a second positive lens having a object side surface concave to the object side, and
at least one negative lens.

A nineteenth aspect of the present invention is a camera including a zoom lens system and an image pick up device arranged image plane position of the zoom lens system, wherein the zoom lens system comprises, in order from an object side to an image plane side thereof:
a first lens group having positive refractive power,
a second lens group having negative refractive power,
a third lens group having positive refractive power,
a fourth lens group having negative refractive power, and
a fifth lens group having positive refractive power,
  wherein:
all spaces between the lens groups are varied while changing magnification, and wherein:
the fifth lens group comprises only two lenses, these two lenses consist of, in order from the object side, a positive lens, and a negative lens having an absolute of curvature of an object side surface larger than an absolute of curvature of an image side surface, and
the positive lens and the negative lens are separated.

A twentieth aspect of the present invention is a camera including a zoom lens system and an image pick up device arranged image plane position of the zoom lens system, wherein the zoom lens system comprises, in order from an object side to an image plane side thereof:
a first lens group having positive refractive power,
a second lens group having negative refractive power,
a third lens group having positive refractive power,
a fourth lens group having negative refractive power, and
a fifth lens group having positive refractive power,
  wherein:
the first lens group, the second lens group, and the third lens group are moved individually while changing the magnification of the zoom lens system from a wide-angle end to a telephoto end, so that:
a distance between the first lens group and the second lens group becomes wide,
a distance between the second lens group and the third lens group becomes narrow,
a distance between the third lens group and the fifth lens group becomes wide,
the second lens group moves in such a way as to arrive at the object side of
the zoom lens system at the telephoto end rather than at a wide-angle end, and
wherein the zoom lens system satisfies the following conditions:

$$1 < d_{2it}/d_{2iw} < 1.6 \qquad (21)$$

$$3 \text{ mm} < \{(d_{3t}+d_{4t})-(d_{3w}+d_{4w})\}/(f_t/f_w) < 6 \text{ mm} \qquad (22)$$

where
$d_{2iw}$ is a distance between an object side surface of the second lens group and an image plane at a wide-angle end,
$d_{2it}$ is a distance between the object side surface of the second lens group and the image plane at a telephoto end,
$d_{3w}$ is a spacing between the third lens group and the fourth lens group at a wide-angle end,
$d_{3t}$ is a spacing between the third lens group and the fourth lens group at the telephoto end,
$d_{4w}$ is a spacing between the fourth lens group and the fifth lens group at the wide-angle end,
$d_{4t}$ is a spacing between the fourth lens group and the fifth lens group at the telephoto end,
$f_t$ is a focal length of the zoom lens system at the telephoto end, and
$f_w$ is a focal length of the zoom lens system at the wide-angle end.

DESCRIPTION OF THE PREFERRED EMBODIMENTS

Figure 1:
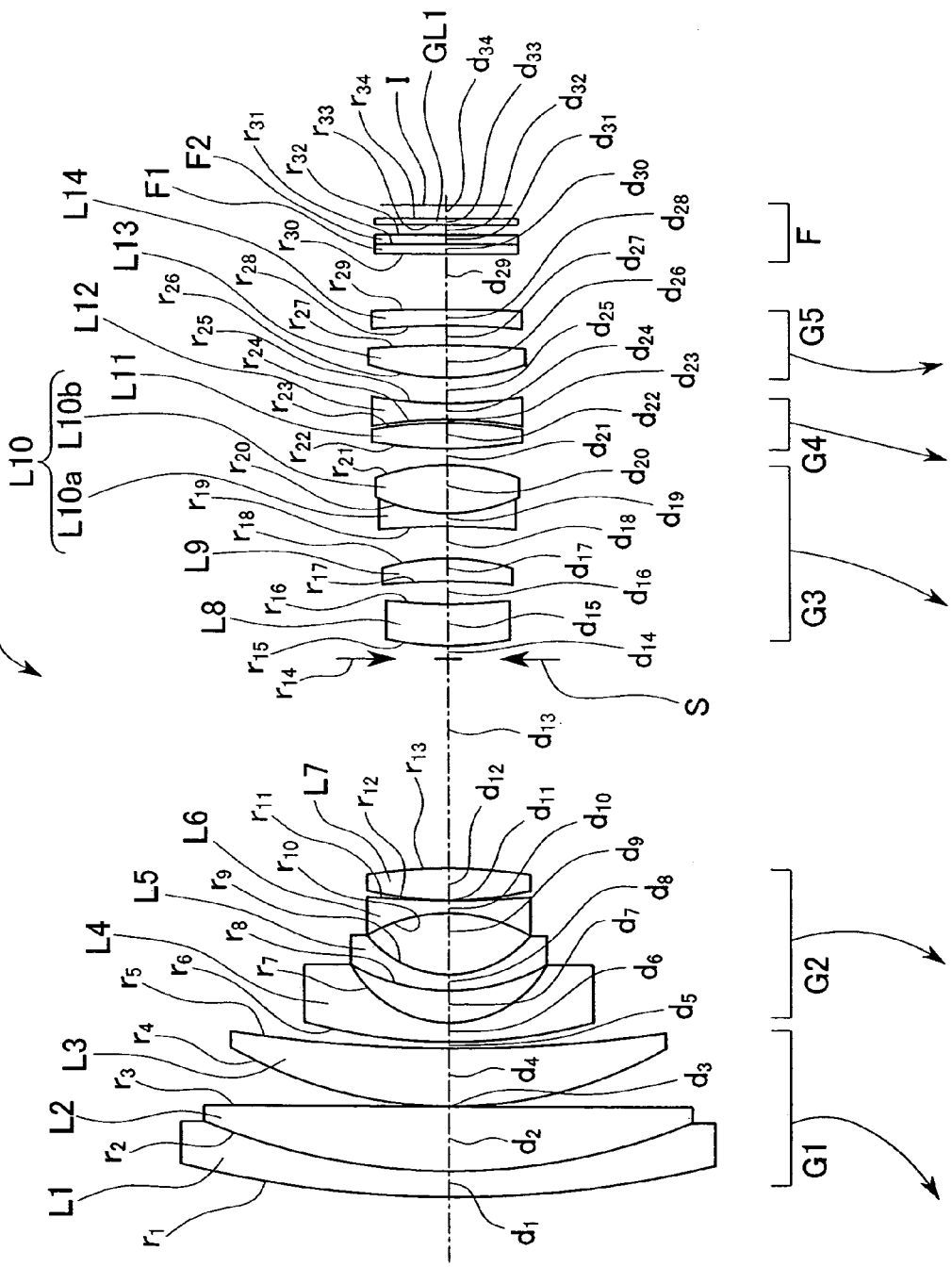
FIG. 1 is a cross-sectional drawing of a lens at the wide-angle end of the zoom lens while focused on a point at infinity according to a first example of the first embodiment of the present invention.

The zoom lens according to the present invention provides a group configuration having at least, in order from the object side, a first lens group having a positive refractive power, a second lens group having a negative refractive power, a third lens group having a positive refractive power, a fourth lens group having a negative refractive power, and a fifth lens group having a positive refractive power. The group movement, group configuration, and other conditions are variously defined. Thus, the respective operations and effects of the group configuration, group movement, the configuration within groups, and other conditions will be explained below.

The group configuration for the zoom lens of the present invention is based on a type of zoom lens known in conventional technology, and has, in order from the object side, positive, negative, positive and positive refractive power lens groups, and attains a zoom lens having a magnification equal to or greater than 4 times, including the wide-angle area, and in particular, has a magnification of 5 times. Thus, first the operation and effect of the type of zoom lens that is formed by such positive, negative, positive, and positive lens groups will be simply explained below.

Such a configuration of the lens groups places the positive refractive power group in front, and thus is an advantageous lens type for increasing angle at the wide-angle end, increasing the change in magnification, and increasing the aperture. In addition, in relation to changing the magnification from the wide-angle end to the telephoto end, changing the magnification by increasing the distance between first lens group and the second lens group and decreasing the distance between the second lens group and the third lens group is a preferred configuration for this type of zoom lens.

At the wide-angle end, the combined power of the first and second groups becomes negative, and the combined power of the third and fourth lens groups becomes positive, and thus from the first lens group to the fourth lens group; the refractive power arrangement of a retro-focus type is formed. Thus, this is advantageous for guaranteeing focusing space while rear focus because a sufficient back focus can be guaranteed. In addition, this configuration is preferable in terms of shortening the total lens length at the telephoto end.

In addition, the positive, negative, positive, positive refractive power type zoom lens has a configuration in which the positive third lens group and the positive fourth lens group cause opposite aberration and cancel each other out.

However, in the group configuration of a positive, negative, positive, positive refractive power type zoom lens, in order to shorten the total length of the lens system of the wide-angle end, it is necessary to strengthen the combined power of the first and second lens groups to some extant. In addition, in order to maintain appropriately the focal distance of the zoom lens system as a whole, it is necessary to strengthen the combined power of the third and fourth lens groups. As a result, in particular the aberration that occurs at the respective third and fourth lens groups becomes large, the sensitivity to eccentricity between each of the groups increases, and a deterioration in performance due to manufacturing error becomes large.

Thus, in the zoom lens of the present invention, the positive fourth lens group of the zoom lens in such conventional technology is partitioned into a negative refractive power front group (referred to as the fourth lens group in the present invention) and a positive refractive power back group (referred to as the fifth lens group in the present invention), and a group configuration of the zoom lens is established that has, in order from the object side, positive, negative, positive, negative, and positive refractive power lens groups.

According to such a group configuration, while changing the magnification, the distance between the fourth lens group and the fifth lens group is varied, and thus the aberration generated at the fourth lens group can be made small. In addition, because the share of the correction of aberration of the third lens group is made small, the respective sensitivities to eccentricity can be made small.

In addition, the power arrangement of the combined system from the first lens group to the fifth lens group is configured symmetrically due to the positive, negative, positive, negative, positive refractive power group configuration from the object side, and thus the correction of aberration becomes easy.

In addition, when changing the magnification, because the distance between many lens groups can be varied, even when the zoom ratio is a high magnification of about 5, the fluctuation in aberration while changing the magnification can be repressed.

Next, the operation and effects due to the movement of each of the lens groups of the zoom lens of the present invention will be explained.

The zoom lens of the present invention is configured to provide at least five lens groups, and while changing the magnification, at least the first lens group, the second lens group, and the third lens group are moved. Thereby, the distance between the first lens group and the second lens group increases from the wide-angle end to the telephoto end; the distance between the second lens group and the third lens group decreases from the wide-angle end to the telephoto end; the distance between the third lens group and the fifth lens group increases from the wide-angle end to the telephoto end; and the second lens group moves more towards the object side at the telephoto end than the wide-angle end. This structure guarantees the width of movement of the third lens group. In addition, changing the magnification is carried out by moving mainly the second lens group and the third lens group, and the misalignment of the image plane is compensated by the movement of the fourth lens group and the fifth lens group.

In the zoom lens of the present invention, when the optical system is made bright by making the minimum F number of the wide-angle end small, the aberration at each of the lens groups becomes large. In particular, the relative sensitivity to eccentricity between the third lens group and the fourth lens group becomes high.

Thus, in the zoom lens of the present invention, the amount of movement of the third lens group while changing the magnification is made large, and the operation of the change of magnification of the fourth lens group is shared by the third lens group. As a result, it is possible to weaken the power of the fourth lens group to some extent, and thus even in the case that the minimum F number of the wide-angle end is made small, it is possible to decrease the relative sensitivity to eccentricity between the third lens group and the fourth lens group.

In addition, in the group movement of the zoom lens of the present invention, furthermore, preferably the position of the third lens group at the wide-angle end is moved further toward the object side than the position of the second lens group at the wide-angle end. In addition, when changing the magnification from the wide-angle end to the telephoto end, preferably the fourth and fifth lens groups are moved.

In this manner, it is possible to make the relative sensitivity to eccentricity between the third lens group and the fourth lens group smaller.

In addition, as described above, the zoom lens of the present invention has a structure that allows a weakening of the power of the fourth lens group to some extent, and thus the fluctuation in the position of the image plane that accompanies the change of the magnification from the first lens group to the third lens group is compensated mainly by the fifth lens group.

Thus, in the group movement of the zoom lens of the present invention, when changing the magnification from the wide-angle end to the telephoto end, preferably the fifth lens group is moved non-linearly.

In this manner, the fluctuation in the position of the image plane that accompanies the changing the magnification from the first lens group to the third lens group is advantageously compensated, and thereby it is possible to guarantee the position of the image plane.

In this case, in order to compensate advantageously the aberration over the entire range of magnification while zooming, preferably the fifth lens group is moved along a convex locus towards the object side. That is, preferably the distance between the third lens group and the fifth lens group is increased more at the telephoto end than the wide-angle end. In addition, in this case, while changing the magnification from the wide-angle end to the telephoto end, preferably the fourth lens group is moved towards the object side.

In addition, in the group movement of the zoom lens of the present invention, a stop is disposed between the second lens group and the third lens group, and while focusing on a point at infinity, when changing the magnification from the wide-angle end to the telephoto end: the first lens group moves along the optical axis; the second lens group moves along the optical axis on a convex locus towards the image side; third lens group moves along the optical axis monotonically towards the object side; the fourth lens group moves along the optical axis monotonically towards the object side, and the fifth lens group moves along the optical axis along a convex locus towards the object side, and at the same time, the first lens group at the telephoto end is positioned more towards the object side than the wide-angle end, and the second lens group at the telephoto end is positioned more towards the object side than the wide-angle end.

Due to such group movement, there are at least five lens groups that can move, and thus it is possible to suppress fluctuation in the aberration while changing the magnification advantageously, and it is possible to realize a high resolution easily.

In addition, because a stop is disposed between the second lens group and the third lens group, the first lens group moves along the optical axis, the position of the first lens group at the telephoto end is more towards the object side than the wide-angle end, the second lens group moves along the optical axis on a convex locus towards the image side, and the position of the second lens group at the telephoto end is more towards the object side than the wide-angle end. Thus, because the position of the entrance pupil can be set appropriately along the entire range of magnification while changing the magnification, it is possible to make a high angle of view zoom lens that has a half angle of view that is equal to or greater than 35° while maintaining a small diameter for the first lens group.

Next, the operation and effects due to the configuration between each of the lens groups of the zoom lens of the present invention will be explained.

In the configuration between the groups of the zoom lens of the present invention, the second lens group includes, in order from the object side, a first negative lens, a second negative lens, a third negative lens, and a fourth positive lens, and thereby aberration that occurs in the second lens group can be advantageously compensated.

That is, the second lens group is preferably formed by a front group that has a negative refractive power and a back group that has a positive refractive power. In such a case, when a wide-angle area is included and there is high magnification, the compensation of the barrel distortion and field curvature becomes difficult. According to the configuration between groups described above, the distortion and the field curvature that occurs at the second lens group can be compensated advantageously.

In addition, because the second lens group has a magnifying action, in order to perform the magnifying action with a small amount of movement in order to downsize, preferably the second lens group has a strongly negative refractive power. In addition, due to having a wide-angle, preferably the second lens group has an even stronger negative refractive power. Here, the second lens group may be configured, in sequence from the object side, by a negative single lens, a negative single lens, a negative single lens, and a positive single lens.

According to such a structure, because the negative refractive power is shared by comparatively many lenses, it is possible to suppress aberration that occurs at the second lens group.

In addition, the second lens group preferably has at least one aspheric surface on one of the three negative lenses of the second lens group closest to the object side.

According to such a structure, when the minimum F number of the wide-angle end is made small, the distortion and field curvature that occurs at the second lens group can be more favorably compensated.

In addition, in such a structure, preferably the image side surface of the second negative lens of the second lens group in order from the object side is made aspheric. In this case, it is possible to compensate even more advantageously the field curvature at the wide-angle end.

In addition, in the configuration between the groups of the zoom lens of the present invention, the third lens group includes a positive lens group which has at least a first positive lens and a second positive lens on the object side, and a negative lens group which has at least one negative lens on the image side. Thus, even if the F number is small, the aberration that occurs at the third lens group can be advantageously compensated.

In particular, in order to compensate the spherical aberration advantageously, the positive lens (first positive lens) of the positive lens group that is closest to the object side can be a positive lens that has a curvature on the object side that is larger. In addition, in order to advantageously compensate the field curvature and the off-axial coma, preferably the positive lens (second positive lens) of the positive lens group on the image side is a positive meniscus lens having a concave surface that faces towards the object side.

In addition, in particular in order to compensate the aberration of the third lens group, preferably the third lens group is configured by four lenses. That is the positive lens group on the object side includes, in order from the object side, a first positive lens and a second positive lens, and the negative lens group on the image side includes, in order from the object side, a third negative lens and a fourth positive lens.

In addition, an aperture stop is disposed at the front (object side) of this third lens group, and this aperture stop moves integrally with the third lens group while changing the magnification. In this case, by disposing a positive lens group on the object side near the aperture stop, and by disposing a negative lens group on the image side near the aperture stop, it is possible to correct the spherical aberration and the field curvature over the entire range of magnification while zooming.

In addition, the third lens group can be formed having, in order from the object side, a positive single lens, a positive single lens, and a cemented lens including a negative lens and a positive lens.

Because the third lens group has a magnification action, a strong positive power is necessary to perform the magnification action with a small amount of movement in order to downsize. In addition, in the case that the third lens group is behind the aperture stop, the on-axis bundle of rays becomes large. In particular, in the case of a bright optical system, the bundle of rays becomes large.

Thus, due to such a configuration, the positive power is shared by more lenses, and thereby it is possible to suppress the aberration that occurs at the third lens group.

In addition, in order to correct the spherical aberration that occurs at the third lens group advantageously, preferably at least one surface of the first lens which is disposed closest to the aperture stop at the object side is an aspheric surface.

Furthermore, in this case preferably the lens shape has a positive meniscus lens having a convex surface that faces towards the object side such that the relative sensitivity to eccentricity between the front surface and the back surface of the lens element does not become high. In this manner, because the occurrence of spherical aberration of these surfaces becomes small, it is possible to make the relative sensitivity to eccentricity between front surface and the back surface of the lens element lower.

In addition, preferably the third lens group includes a lens which has aspheric surfaces on both sides. In this manner, it is possible to compensate more advantageously the spherical aberration that occurs at the third lens group.

In addition, in the configuration within the groups of the zoom lens of the present invention, the fourth lens group has at least one bi-convex lens and one bi-concave lens, and has absolute values of the radii of curvature of both surfaces of either of these lenses that are equal.

According to such a configuration, it is possible to improve the efficiency of the processing and assembling.

In addition, in the configuration within the groups of the zoom lens of the present invention, the fifth lens group is combined positive lenses and negative lenses.

Due to such a configuration, the off-axial field curvature can be advantageously compensated.

In addition, in order to shorten the total length of the lens over the entire range of magnification while zooming, preferably a positive lens is on the object side, and a negative lens is on the image side.

In addition, in order to compensate the field curvature more advantageously, preferably the negative lens on the image side is formed by a negative lens that has a curvature on the object side that is larger.

In addition, to make the refractive power of the negative lens act effectively and make the compensation of the field curvature more advantageous, preferably an air space is provided between the positive lens on the object side and the negative lens on the image side. It is suitable that the length of the air space is equal to or greater than 10% and equal to or less than 90% of the overall length of the fifth lens group.

The focusing of the configuration of the zoom lens of the present invention is carried out by focusing the fourth lens group or the fifth lens group, and this is preferable in terms of restraining the aberration fluctuation while focusing to a small amount.

However, in order to make the relative sensitivity to eccentricity between the third lens group and the fourth lens group small, in the case that the refractive power of the fourth lens group is comparatively weakened, when the focusing is carried out by using the fourth lens group, there is the possibility that the amount of focusing movement will become large, and thus more preferably the focusing is carried out by moving the fifth lens group.

Thereby, because the fifth lens group has a positive refractive power, by extending the fifth lens group to the object side, it is possible to focus from infinity to close range. At this time, the amount of extension with respect to an identical object distance is small at the wide-angle end, but is large at the telephoto end.

When changing magnification from the wide-angle end to the telephoto end, the fourth lens group moves along the optical axis monotonically towards the object side, and the fifth lens group moves along the optical axis on a convex locus towards the object side. Then at the telephoto end, because the spacing between the fourth lens group and the fifth lens group has opened, the length of the whole does not become long and the focusing space can be ensured.

In addition, because the lens diameter of the fifth lens group is comparatively small, it is possible to carry out focusing quickly.

Next, each of the preferred conditional expressions that are fulfilled by the zoom lens of the present invention will be explained.

The above conditional expression (21) defines the appropriate range in which the overall length of the lens at the wide-angle end can be shortened while advantageously maintaining the aberration characteristics over the entire range of magnification while zooming.

When the conditional expression (21) is lower than the lower limit value, the overall length at the wide-angle end becomes long.

In contrast, when the upper limit of the conditional expression (21) is exceeded, although the overall length becomes short, because the refractive power of each of the lens groups behind the second lens group becomes strong, it is difficult to suppress fluctuation of the aberration while changing the magnification.

Here, preferably the upper limit value is 1.4 or 1.2, and preferably the lower limit value is 1.01 or 1.02. For example, preferably:

$$1.01 < d_{2it}/d_{2iw} < 1.4 \qquad (21a)$$

and more preferably:

$$1.02 < d_{2it}/d_{2iw} < 1.2 \qquad (21b)$$

The conditional expression (22) defines the appropriate range in which the relative sensitivity to eccentricity between the third lens group and the fourth lens group is made small.

When the conditional expression (22) is lower than the lower limit value, the amount of movement of the third lens group becomes small, and thus the share of the change of magnification of the fourth lens group becomes large. As a result, the power of the fourth lens group becomes strong, and thus the relative sensitivity to eccentricity between the third lens group and the fourth lens group becomes high.

In contrast, the conditional expression (22) is upper than the upper limit value, the amount of movement of the third lens group becomes large, and it becomes difficult to shorten the overall length of the lens at the telephoto end.

Here, preferably the upper limit value is 5.5 or 5, and the lower limit value is 3.2 or 3.4. For example, preferably:

$$3.2 < \{(d_{3t}+d_{4t})-(d_{3w}+d_{4w})\}/(f_t/f_w) < 5.5 \quad (22a)$$

and more preferably:

$$3.4 < \{(d_{3t}+d_{4t})-(d_{3w}+d_{4w})\}/(f_t/f_w) < 5 \quad (22b)$$

The above conditional expression (15) defines the appropriate range in which the occurrence of spot flares is suppressed.

For example, when taking into account the shading of an electrical image pick-up element such as a CCD to set the exit pupil position appropriately and taking into account the downsizing of the overall length of the lens, and the surface of the fourth lens group closest to the image side is most suitably a concave surface which faces towards the object side and has the effect of refracting the off-axial ray in the direction of separation from the optical axis. However, when the radius of curvature of the concave surface is not appropriately set, there is the occurrence of spot flares due to the interaction with any of the lens surfaces of the fifth lens group.

Figure 10:
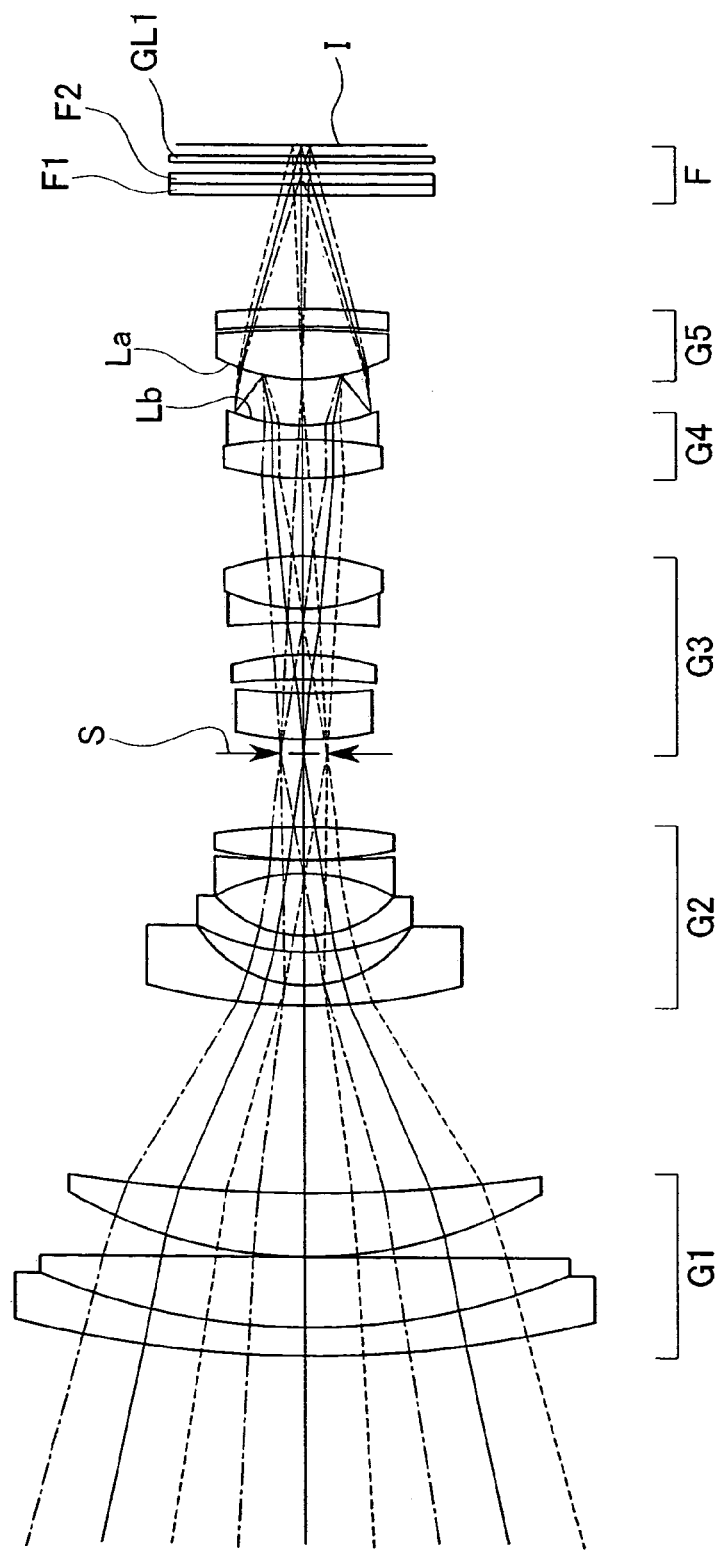
FIG 10 is a cross-sectional drawing of the lens for explaining the state in which a spot flare occurs in the zoom lens having a five-group configuration.

FIG. 10 is a cross-sectional drawing of a lens for explaining the conditions under which spot flares occur. The bundle of rays is reflected at the lens surface La of the fifth lens group G5 on the object side, and then the bundle is again reflected at the lens surface Lb of the fourth lens group, which is closest to the image side and concave on the object side, the bundle is focused on the image plane, and thereby a spot flare occurs.

Thus, in order to prevent the occurrence of a spot flare, it is necessary to set the radius of curvature of the surface of the fourth lens group closest to the image side appropriately.

When the conditional expression (15) is exceeded the range of the absolute value, because the radius of curvature become small, it becomes easy to condense, and the spot flare occurs easily.

Here, preferably the upper limit value of $|IH/r_{4r}|$ is 0.3 or 0.25. For example, preferably:

$$|IH/r_{4r}| < 0.3 \quad (15a)$$

and more preferably:

$$|IH/r_{4r}| < 0.25 \quad (15b)$$

The conditional expression (16) defines the appropriate range for suppressing the occurrence of spot flare when the surface of the fifth lens group closest to the object side is convex surface that faces towards the object side. In particular, preferably the conditional expression (16) is satisfied simultaneously with conditional expression (15).

When taking into account the shading of an electrical image pick-up device such as a CCD to optimally set the exit pupil position and taking into account the downsizing of the overall length of the lens, the surface of the fifth lens group closest to the object side is most suitably a convex surface which faces towards the object side, and has the effect of bending the off-axial rays towards the optical axis side. However, in order to prevent the occurrence of the spot flare due to interaction with any of the lens surfaces of the fourth lens group, it is necessary to set the radius of curvature of the convex surface appropriately (refer to FIG. 10).

When the conditional expression (16) is exceeded the range of the absolute value, because the radius of curvature becomes small, and the condensation of the light becomes easy, and the spot flare occurs easily.

Here, preferably the upper limit value of $|IH/r_{5f}|$ is 0.45 or 0.4. For example, preferably:

$$|IH/r_{5f}| < 0.45 \quad (16a)$$

and more preferably:

$$|IH/r_{5f}| < 0.4 \quad (16b)$$

Preferably, the zoom lens of the present invention satisfies the next conditional expression (1):

$$0 < (d_{2it}-d_{2iw})/d_{2wi} < 0.3 \quad (1)$$

where $d_{2iw}$ is the distance between the lens surface of the second lens group closest to the object side at the wide-angle end and the image plane, and $d_{2it}$ is the distance between the lens surface of the second lens group closest to the object side at the telephoto end and the image plane. Note that in the case that there is a filter or a CCD cover glass here, the distance is equal to the length which is calculated by being replaced the refractive index of the material with the refractive index of air.

The conditional expression (1) defines the appropriate range of the ratio between the amount of movement of the second lens group from the wide-angle end to the telephoto end and the distance between the lens surface at the wide-angle end closest to the object side and the image plane.

In the zoom lens of the present invention, the spacing between the first lens group and the second lens group becomes minimal at the wide-angle end and becomes maximal at the telephoto end. Thus, in order to prevent the overall length at the wide-angle end (the length from the lens surface of the first lens group closest to the object side to the image plane) from becoming long, it is necessary to make $d_{2iw}$ small.

When the conditional expression (1) is lower than the lower value, the overall length in the wide-angle end becomes long.

In contrast, when the conditional expression (1) is upper than the upper value, although the overall length becomes short, the refractive power of each of the lens groups behind the second lens group becomes strong, and thus it becomes difficult to suppress the fluctuation in the aberration when changing magnification.

Here, preferably the upper limit value is 0.2 or 0.1, and preferably the lower limit value is 0.01 or 0.02. For example, preferably:

$$0.01 < (d_{2it}-d_{2iw})/d_{2iw} < 0.2 \quad (1a)$$

and more preferably:

$$0.02 < (d_{2it}-d_{2iw})/d_{2iw} < 0.1 \quad (1b)$$

Preferably the zoom lens of the present invention satisfies the following conditional expressions:

$$-2.0 < f_2/f_w < -0.7 \quad (3)$$

$$1.5 < f_3/f_w < 4.0 \quad (4)$$

where $f_w$ is the focal distance of the overall system at the wide-angle end, $f_2$ is the focal distance of the second lens group, and $f_3$ is the focal distance of the third lens group.

The conditional expressions (3) and (4) define the appropriate range of the refractive power of each of the lens groups of the second lens group and the third lens group.

Since the conditional expressions (3) and (4) is satisfied, it is possible to arrange appropriately the refractive powers of these lens groups, and the fluctuation in the aberration while changing the magnification becomes small, and it is possible to suppress advantageously the aberration.

When the conditional expressions (3) and (4) are lower than the lower limit value, the refractive power becomes too strong, and thus it becomes difficult to suppress the fluctuation in the aberration while changing the magnification.

In addition, when the conditional expressions (3) and (4) are upper than the upper limit value, the refractive power becomes weak and the overall length becomes long, and thus it is difficult to downsize.

Here, preferably the upper limit value of conditional expression (3) is −0.9 or −1.1, and the upper limit value for conditional expression (4) is 3.5 or 3. In addition, preferably the lower limit value of the conditional expression (3) is −1.7 or −1.5, and the lower limit value for conditional expression (4) is 2 or 2.5. For example, preferably:

$$1.7 < f_2/f_w < -0.9 \quad (3a)$$

$$2 < f_3/f_w 3.5 \quad (4a)$$

and more preferably:

$$-1.5 < f_2/f_w < -1.1 \quad (3b)$$

$$2.5 < f_3/f_w < 3 \quad (4b)$$

Preferably, the zoom lens of the present invention satisfies the following conditional expression (2):

$$4.5 < f_1/f_w < 13.5 \quad (2)$$

where $f_w$ is the focal distance of the overall system, and $f_1$ is the focal distance of the first lens group.

Conditional expression (2) defines the appropriate range in which the entrance pupil position from the wide-angle end to the telephoto end is suitably maintained, and the fluctuation in the aberration while changing the magnification is suppressed.

When the conditional expression (2) is lower than the lower limit value, the refractive power becomes too strong, and thus it is difficult to compensate the distortion that occurs at the first lens group at the second lens group and after.

When the conditional expression (2) is upper than the upper limit value, the refractive power becomes too weak and the effect of bending the off-axial ray by the first lens group becomes weak, and thus the overall length becomes long.

Here, preferably the upper limit value is 12 or 10, and preferably the lower limit value is 5.5 or 6.5. For example, preferably:

$$5.5 < f_1/f_w < 12 \quad (2a)$$

and more preferably:

$$6.5 < f_1/f_w < 10 \quad (2b)$$

Preferably the zoom lens of the present invention satisfies the following conditional expression (6):

$$2.5 < f_5/f_w < 8.5 \quad (6)$$

where $f_w$ is the focal distance of the overall system and $f_5$ is the focal distance of the fifth lens group.

Conditional expression (6) defines the appropriate range in which the exit pupil position from the wide-angle end to the telephoto end is suitably maintained and the fluctuation in aberration due to focusing is suppressed.

For example, when using an electric image pick-up element such as a CCD in, for example, a digital camera, the exit pupil applied to a CCD to be used must be designed taking into consideration of the shading. Generally, preferably the chief ray, along with the axial ray and off-axial ray, are incident substantially perpendicular to the CCD.

When the conditional expression (6) is lower than the lower limit value, the refractive power becomes too weak, and thus the fluctuation in aberration due to focusing becomes large.

In addition, when the conditional expression (6) is upper than the upper limit value, the refractive power becomes weak, and thus the amount of movement of the focusing lens group becomes large.

Here, preferably the upper limit value is 7.5 or 6.5, and preferably the lower limit value is 3.5 or 4.5. For example, preferably:

$$3.5 < f_5/f_w < 7.5 \quad (6a)$$

and more preferably:

$$4.5 < f_5/f_w < 6.5 \quad (6b)$$

Preferably, in the zoom lens of the present invention, the following conditional expression (5) is satisfied simultaneously with the conditional expressions (2), (3), (4), and (6):

$$-60 < f_4/f_w < -14 \quad (5)$$

where $f_w$ is the focal distance of the overall system at the wide-angle end and $f_4$ is the focal distance of the fourth lens group.

The conditional expressions (2) to (6) define the preferable range in which:

1. the entrance pupil position is suitably maintained from the wide-angle end to the telephoto end and the diameter of the first lens group is kept small;
2. fluctuation in the aberration while changing the magnification is suppressed;
3. the exit pupil position is suitably maintained taking into consideration the shading of the electric image pick-up element such as a CCD; and
4. the total length of the lens is downsized.

Therefore, by realizing a refractive power arrangement that satisfies these conditional expressions simultaneously, the balance between the properties 1 through 4 described above can be maintained.

Here, preferably the upper limit value of the conditional expression (5) is −19 or −14, and preferably the lower limit value thereof is −55 or −50.

In addition, the upper limit value and the lower limit value of the conditional expressions (2), (3), (4), and (6), are the values identical to those that have been described above.

Preferably, the next conditional expression (5a) and conditional expressions (2a), (3a), (4a), and (6a) are satisfied simultaneously.

$$-55 < f_4/f_w < -19 \tag{5a}$$

In addition, preferably the next conditional expression (5b) and conditional expressions (2b), (3b), (4b), and (6b) are satisfied simultaneously.

$$-50 < f_4/f_w < -24 \tag{5b}$$

In the zoom lens of the present invention, preferably when the first lens group has at least one positive lens and one negative lens, the following conditional expressions (7) and (8) are satisfied:

$$65 < v_{d1p} < 100 \tag{7}$$

$$15 < v_{d1n} < 30 \tag{8}$$

where $v_{d1p}$ is the Abbe number with respect to the d-line of at least one positive lens in the first lens group, and $v_{d1n}$ is the Abbe number with respect to the d-line of at least one negative lens in the first lens group.

The conditional expressions (7) and (8) define the appropriate range of the Abbe number that makes possible suppressing the chromatic aberration. Therefore, by satisfying these conditional expressions (7) and (8), it is possible to suppress appropriately the chromatic aberration that occurs at the first lens group.

Here, in conditional expression (7), preferably the upper limit value is 95 or 90 and the lower limit value is 67 or 69, and in conditional expression (8), preferably the upper limit value is 27 or 25 and the lower limit value is 15 or 20. For example, preferably:

$$67 < v_{d1p} < 95 \tag{7a}$$

$$15 < v_{d1n} < 27 \tag{8a}$$

and more preferably:

$$69 < v_{d1p} < 90 \tag{7b}$$

$$20 < v_{d1n} < 25 \tag{8b}$$

In the zoom lens of the present invention, preferably the following conditional expressions (9) and (10) are satisfied when the second lens group has at least one positive lens and one negative lens.

$$10 < v_{d2p} < 30 \tag{9}$$

$$75 < v_{d2n} < 100 \tag{10}$$

where $v_{d2p}$ is the Abbe number with respect to the d-line of at least one positive lens of the second lens group, and $v_{d2n}$, is the Abbe number with respect to the d-line of at least one negative lens of the second lens group.

The conditional expressions (9) and (10) define the appropriate range in which it is possible to suppress the chromatic aberration. Since these conditional expressions are satisfied, in particular it is possible to appropriately compensate the chromatic aberration of the magnification at the wide-angle end.

Here, in conditional expression (9), preferably the upper limit value is 27 or 25 and the lower limit value is. 15 or 20, and in the conditional expression (10), preferably the upper limit value is 95 or 90 and the lower limit value is 77 or 80. For example, preferably:

$$15 < v_{d2p} < 27 \tag{9a}$$

$$77 < v_{d2n} < 95 \tag{10a}$$

and more preferably:

$$20 < v_{d2p} < 25 \tag{9b}$$

$$80 < v_{d2n} < 90 \tag{10b}$$

In the zoom lens of the present invention, preferably the following conditional expressions are satisfied when the third lens group has at least one positive lens and at least one negative lens.

$$75 < v_{d3p} < 100 \tag{11}$$

$$10 < v_{d3n} < 30 \tag{12}$$

where $v_{d3p}$ is the Abbe number with respect to the d-line of at least one positive lens in the third lens group, and $v_{d3n}$ is the Abbe number with respect to the d-line of at least one negative lens in the third lens group.

The conditional expressions (11) and (12) define the appropriate range in which it is possible to suppress the chromatic aberration. Since these conditional expressions are satisfied, in particular it is possible to appropriately compensate the on-axis chromatic aberration.

Here, in conditional expression (11), preferably the upper limit value is 95 or 90 and the lower limit value is 77 or 80, and in the conditional expression (12), preferably the upper limit value is 27 or 25 and the lower limit value is 15 or 20. For example, preferably:

$$77 < v_{d3p} < 95 \tag{11a}$$

$$15 < v_{d3n} < 27 \tag{12a}$$

and more preferably:

$$80 < v_{d3p} < 90 \tag{11b}$$

$$20 < v_{d3n} < 25 \tag{12b}$$

In the zoom lens of the present invention, preferably the following conditional expression (13) is satisfied:

$$8.0 < L_w/IH < 23.5 \tag{13}$$

where $L_w$ is the total length at the wide-angle end (the distance from the lens surface of the first lens group closest to the object side to the image plane), and IH is the maximum image height. Note that here, for filter or CCD or cover glass, the length is when the refractive index of air is substituted.

The conditional expression (12) defines the appropriate range for the ratio of the total length on the wide-angle end to the maximum image height. When the conditional expression (12) is lower than the lower limit, the power of each of the lens groups becomes strong, and thus it is difficult to suppress the fluctuation in the aberration while changing the magnification. When the conditional expression (12) is upper than the upper limit, the total length becomes long, and thus it is impossible to downsize.

Here, in conditional expression (13), preferably the upper limit value is 21 or 16 and the lower limit value is 10 or 13.

For example, preferably:

$$10 < L_w/IH < 21 \quad (13a)$$

and more preferably:

$$13 < L_w/IH < 18 \quad (13b)$$

In the zoom lens of the present invention, preferably the following conditional expression (14) is satisfied:

$$0.05 < Bf_w/L_w < 0.14 \quad (14)$$

where $L_w$ is the total length at the wide-angle end (the distance from the lens surface of the first lens group closest to the object side), and B $f_w$ is the back focus at the wide-angle end. Note that in the case that there is a filter or a CCD cover glass here, the thickness of the filter or the CCD cover glass is equal to the length which is calculated by being replaced the refractive index of the material with the refractive index of air.

The conditional expression (14) defines the appropriate range of the back focus at the wide-angle end, the total length at the wide-angle end, and the maximum object height. When the conditional expression (14) is upper than the upper limit, the back focus becomes long, and thus it is impossible to downsize. In addition, when the conditional expression (14) is lower than the lower limit, the total length becomes long, and thus it is impossible to downsize.

Here, in the conditional expression (14), preferably the upper limit value is 0.12 or 0.1 and the lower limit value is 0.06 or 0.07. For example, preferably:

$$0.06 < Bf_w/L_w 0.12 \quad (14a)$$

and more preferably:

$$0/07 < Bf_w/L_w < 0.1 \quad (14b)$$

In the zoom lens of the present invention, preferably the following conditional expression (23) is satisfied:

$$-3.0 < (r_{3f} + r_{3r})/(r_{3f} - r_{3r}) < -0.1 \quad (23)$$

where $r_{3f}$ is the paraxial radius of curvature of the surface closest to the object side of the lens of the third lens group closest to the object side, and $r_{3r}$ is the paraxial radius of curvature of the surface on the image plane side of the lens of the third lens group closest to the object side.

The conditional expression (23) defines the appropriate range of the shape factor for the shape of the lens of the third lens group that is closest to the object side. When the conditional expression (23) is upper than the upper limit, the radius of curvature on the image side becomes strong, and thus it is impossible to compensate the aberration appropriately. In addition, when the conditional expression (23) is lower than the lower limit, similarly the radius of curvature on the image side becomes strong, and thus it is impossible to compensate the aberration appropriately.

Here, in the conditional expression (23), preferably the upper limit value is −0.5 or −1.0 and the lower limit value is −2.0 or −1.5. For example, preferably:

$$-2.0 < (r_{3f} + r_{3r})/(r_{3f} - r_{3r}) < -0.5 \quad (23a)$$

and more preferably:

$$-1.5 < (r_{3f} + r_{3r})/(r_{3f} - r_{3r}) < -1.0 \quad (23B)$$

Note that in the zoom lens of the present invention, each of the conditional expressions described above can be used appropriately in combination. Therefore, in the zoom lens of the present invention, each of the conditional expressions described above can be appropriately combined and used after being arbitrarily applied to the zoom lens of the present invention.

A camera that provides the zoom lens of the present invention is characterized in providing the zoom lens of the present invention and an image pick-up element that is disposed at the image position of the zoom lens.

According to this type of structure, it is possible make a camera that provides the operations and effects that are similar to those of the zoom lens of the present invention. In particular, it is possible to carry out taking high resolution images when using the image pick-up element having a fine pixel pitch and a high resolution.

According to the present invention, a zoom lens can be provided in which it is possible to obtain the high resolution by compensating the aberration advantageously over the entire range of magnification while zooming, the sensitivity to eccentricity is low and manufacturing is easy.

In addition, according to the present invention, it is possible to provide a camera that is equipped with the zoom lens described above.

Below, embodiments of the present invention will be explained with reference to the attached figures.

First Embodiment

The zoom lens according to a first embodiment of the present invention will be explained.

FIG. 1 is a cross-sectional drawing of the lens at the wide-angle end of the first example of the first embodiment of the zoom lens while focusing on a point at infinity according to the first embodiment of the present invention. In this figure, the locus of movement of each of the lens groups from the wide-angle end to the telephoto end is schematically shown by using arrows. Reference symbol I denotes the image plane. Note that the detailed numerical examples thereof are shown later as example 1.

As shown in FIG. 1, the schematic structure of the zoom lens 100 of the first example includes a first lens group G1, a second lens group G2, a third lens group G3, a fourth lens group G4, a fifth lens group G5, and a parallel flat lens group F, these groups are disposed in this order from the object side.

The first lens group G1 includes, in order from the object side, a negative lens L1 (first lens), a positive lens L2 (second lens), and a positive lens L3 (third lens), and thereby the first lens group G1 has a positive power.

The negative lens L1 is a negative meniscus lens having a convex surface that faces towards the object side.

The positive lenses L2 and L3 are positive meniscus lenses both having a convexity that faces towards the object side.

Note that below, where there is no possibility of misunderstanding, when generically labeling the negative lens L1, the positive lens L2 and the like, the positive, negative, biconvex, biconcave and the like are omitted, and lenses are simple generically labeled as lens L1, lens L2, and the like.

The second lens group G2 includes, in order from the object side, a negative lens L4 (first lens), a negative lens L5 (second lens), a negative lens L6 (third lens), and a positive lens L7 (fourth lens), and thereby the second lens group G2 has a negative power.

The negative lens L4 is a negative meniscus lens having a convex surface that faces towards the object side.

The negative lens L5 is a negative meniscus lens having a convexity that faces towards the object side. In addition, the lens surface on the image side is aspheric.

The negative lens L6 is a biconcave lens.

The positive lens L7 is a biconvex lens.

The third lens group G3 includes, in order from the object side, a positive lens L8 (first lens), a positive lens L9 (second lens), and a cemented lens L10 that includes a biconcave lens L10A (third negative lens) and a biconvex lens L10b (fourth positive lens), and thereby the third lens group G3 has a positive power. In addition, an aperture stop S that moves integrally with the third lens group G3 is disposed on the object side of the positive lens L8.

The both lens surfaces of the positive lens L8 are aspheric, and the positive lens L8 is a positive meniscus lens having a convexity that faces towards the object side.

The positive lens L9 is a positive meniscus lens having a concave surface that faces towards the object side (having a convex surface that faces towards the image side).

The fourth lens group G4 includes, in order from the object side, a positive lens L11 (first lens) and a negative lens L12 (second lens), and thereby the fourth lens group G4 has a negative power.

The positive lens L11 is a biconvex lens having absolute values of the radii of curvature that are equal.

The negative lens L12 is a biconcave lens having solute values of the radii of curvature that are equal. Therefore, the lens surface of the fourth lens group G4 that is closest to the image side is concave.

The fifth lens group G5 includes, in order from the object side, a positive lens L13 (first lens) and a negative lens L14 (second lens), and thereby the fifth lens group G5 has a positive power.

The positive lens L13 is a biconvex lens. Therefore, the lens surface of the fifth lens group G5 that is closest to the object side is convex.

The negative lens L14 is a concave-flat lens having a concave surface that faces towards the object side.

In addition, an air space is provided between the positive lens L13 and the negative lens L14, and the length of the air space is equal to or greater than 15% or equal to or less than 50% of the total length of the fifth lens group.

The parallel flat lens group F can be obtain the appropriate properties depending on the properties of the electric image pick-up element and the like disposed on the image plane I. In the present embodiment, in order from the object side, the parallel flat lens group F includes an IR cut filter having parallel surfaces, an optical low-pass filter F2, and a cover glass for a CCD GL1, and these are fixed between the last lens group and the image plane I.

For example, the IR cut filter F1 may have a deposition that blocks the infrared rays applied to the parallel flat plates.

As an optical low-pass filter F2, a low-pass filter including a crystal plate in which the direction of the crystal axis has been adjusted or a phase low-pass filter that realizes optical frequency blocking properties by using the diffraction effect can be advantageously used.

In addition, the cover glass GL 1 is a cover glass when disposing a image pick-up element such as a CCD.

Note that a part or all of these can be omitted depending on the case.

In the zoom lens 100, as shown schematically by the arrows in FIG. 1, when changing magnification from the wide-angle end to the telephoto end while focusing on a point at infinity, the first lens group G1 moves along the optical axis on a convex locus towards the image side, the second lens group G2 moves along the optical axis on a convex locus towards the image side, the third lens group G3 moves along the optical axis monotonically towards the object side, the fourth lens group G4 moves along the optical axis monotonically towards the object side, and the fifth lens group G5 moves along the optical axis on a convex locus towards the object side.

As shown in FIG. 1, the position of the first lens group G1 at the telephoto end is more towards the object side than the wide-angle end, and the position of the second lens group G3 at the telephoto end is more towards the object side than the wide-angle end. The third lens group G3 moves integrally with the aperture stop towards the object side.

In addition, by extending the fifth lens group G5 towards the object side, it becomes possible to focus on an object that is nearby.

That is, the distance between the first lens group G1 and the second lens group G2 increases from the wide-angle end to the telephoto end, the distance between the second lens group G2 and the third lens group G3 decreases from the wide-angle end to the telephoto end, and the distance between the third lens group G3 and the fifth lens group G5 increases from the wide-angle end to the telephoto end.

Concretely, for example, in the case of the structure of example 1 described below, in order to change from the focus on a point at infinity to 0.2 m at the wide-angle end, the fifth lens group G5 is extended towards the object so that the distance between the fourth lens group G4 and the fifth lens group G5 changes from 2.409 mm to 1.988 mm. In addition, in order to change from the focus on a point at infinity to 0.2 m at the telephoto end, the fifth lens group G5 is extended towards the object such that the distance between the fourth lens group G4 and the fifth lens group G5 changes from 14.009 mm to 8.243 mm.

Next, a zoom lens according to a second example of the present embodiment will be explained.

Figure 2:
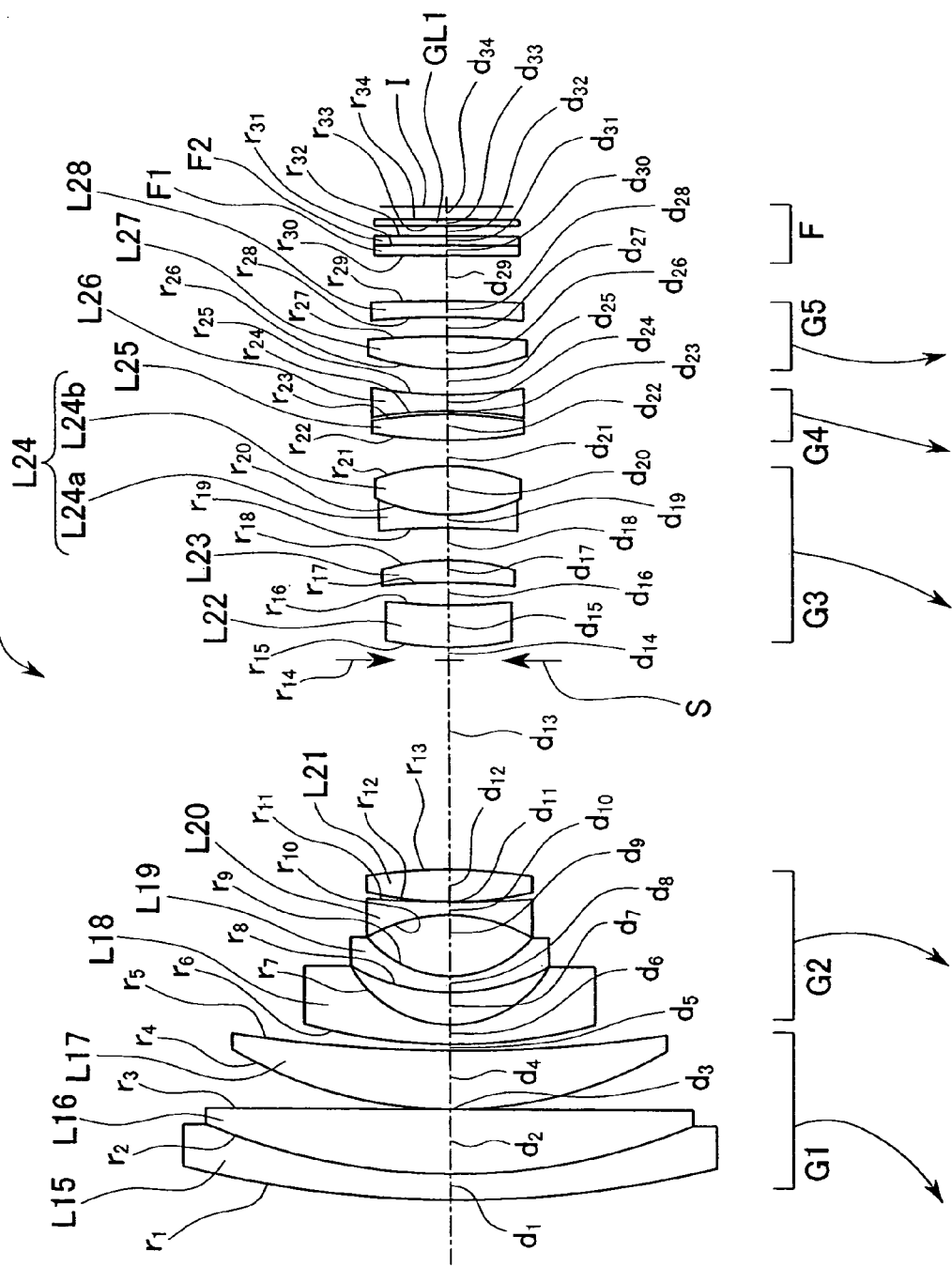
FIG. 2 is a cross-sectional drawing of a lens at the wide-angle end of the zoom lens while focused on a point at infinity according to a second example of the first embodiment of the present invention.

FIG. 2 is a cross-sectional drawing of a lens at the wide-angle end of the zoom lens while focused on a point at infinity according to a second example of the first embodiment of the present invention. In this figure, the locus of movement of each of the lens groups from the wide-angle end to the telephoto end is schematically shown by using arrows. Reference symbol I denotes the image plane. Note that the detailed numerical examples thereof are shown later as example 2.

As shown in FIG. 2, the schematic structure of the zoom lens 101 of the second example provides lenses L15 to L27, L24a, and L24b, having a lens shape of the same type, where the positive and negative powers match, corresponding to the lenses L1 to L13, L10a, and LO10b of the first example of the embodiment described above. In addition, in place of the negative lens L14 in the embodiment described above, a negative lens L28 is provided. Note that the stop S and the parallel flat lens group F are identical to those in the embodiment described above.

The negative lens L28 is a negative meniscus lens having a convex surface that faces the object side.

In addition, the positive lens L25 and the negative lens L26, like the positive lens L11 and the negative lens L12, have absolute values of the radii of curvature of both lens surfaces that are equal.

In addition, the surfaces of the negative lens L119, like the negative lens L5, is aspheric surfaces.

In addition, both surfaces of the positive lens L22, like the positive lens L8, are aspheric surfaces.

In the zoom lens 101, as shown schematically by the arrows in FIG. 2, when changing magnification from the wide-angle end to the telephoto end while focusing on a point at infinity, the first lens group G1 moves along the optical axis on a convex locus towards the image side, the second lens group G2 moves along the optical axis on a convex locus towards the image side, the third lens group G3 moves along the optical axis monotonically towards the object side, the fourth lens group G4 moves along the optical axis monotonically towards the object side, and the fifth lens group G5 moves along the optical axis on a convex locus towards the object side.

As shown in FIG. 2, the position of the first lens group G1 at the telephoto end is more towards the object side than the wide-angle end, and the position of the second lens group G3 at the telephoto end is more towards the object side than the wide-angle end. The third lens group G3 moves integrally with the aperture stop towards the object side.

In addition, by extending the fifth lens group G5 towards the object side, it is possible to focus on an object that is nearby. Concretely, in the case of the example 2 described below, in order to change from the focus on a point at infinity to 0.2 m at the wide-angle end, the fifth lens group G5 is extended towards the object so that the distance between the fourth lens group G4 and the fifth lens group G5 changes from 2.423 mm to 2.000 mm. In addition, in order to change from the focus on a point at infinity to 0.2 m at the telephoto end, the fifth lens group G5 is extended towards the object such that the distance between the fourth lens group G4 and the fifth lens group G5 changes from 14.162 mm to 8.395 mm.

Next, the zoom lens according to a third example of the present embodiment will be explained.

Figure 3:
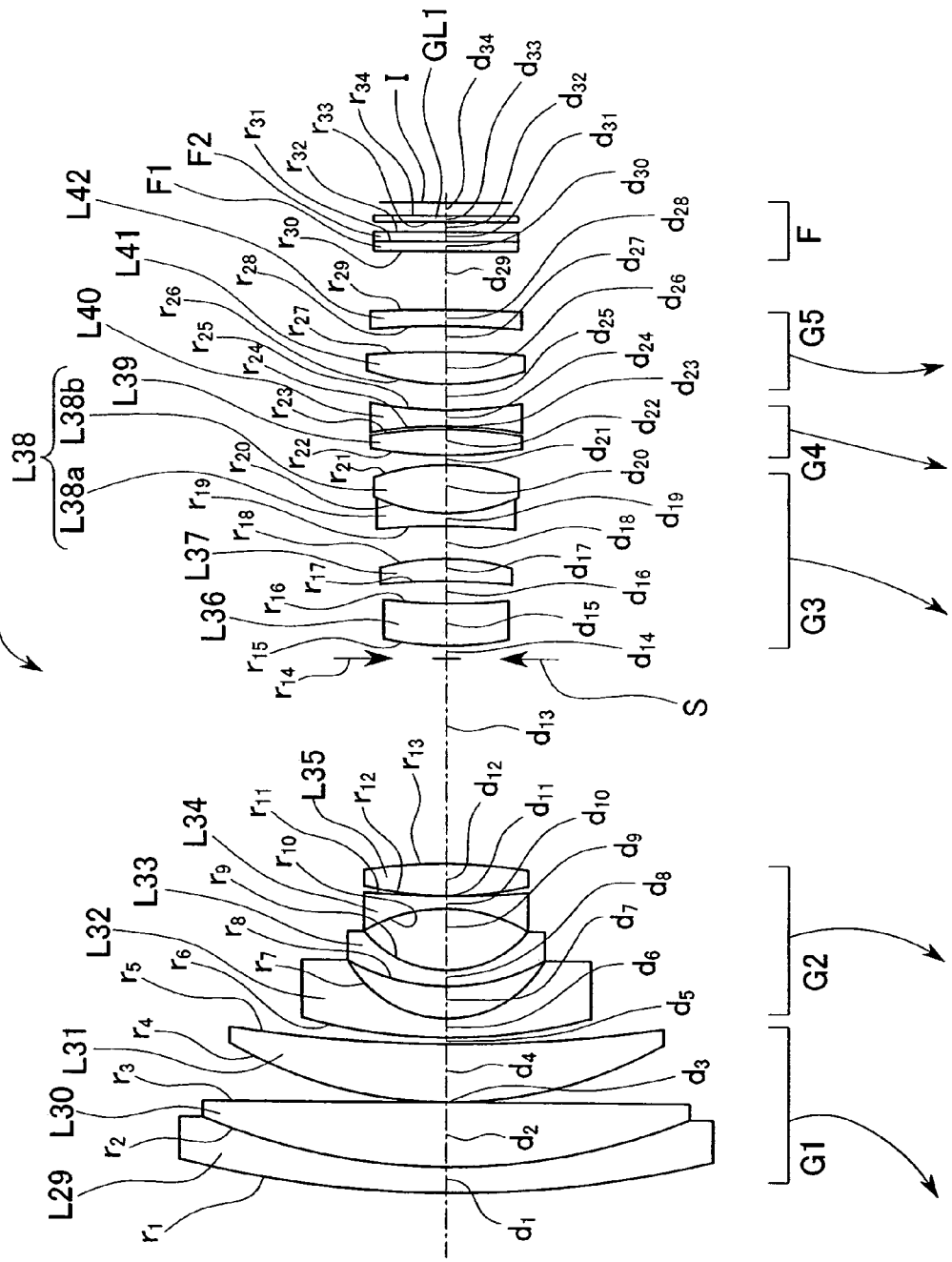
FIG. 3 is a cross-sectional drawing of a lens at the wide-angle end of the zoom lens while focused on a point at infinity according to a third example of the first embodiment of the present invention.

FIG. 3 is a cross-sectional drawing of a lens at the wide-angle end of the zoom lens while focused on a point at infinity according to a third example of the first embodiment of the present invention. In this figure, the locus of movement of each of the lens groups from the wide-angle end to the telephoto end is schematically shown by using arrows. Reference symbol I denotes the image plane. Note that the detailed numerical examples thereof are shown later as example 3.

As shown in FIG. 3, the schematic structure of the zoom lens 102 of the third example provides lenses L29, L31 to L41, L38a, and L38b, having a lens shape of the same type, where the positive and negative powers match, corresponding to the lenses L1, L3 to L13, L10a, and L10b of the first example of the embodiment described above. In addition, in place of the positive lens L2 in the embodiment described above, a positive lens L30 is provided, and in place of the negative lens L14, the negative lens L42 is provided. Note that the stop S and the parallel flat lens group F are identical to those in the embodiment described above.

The positive lens L30 is a biconvex lens.

The negative lens 42 is a negative meniscus lens having a convex surface that faces towards the image side.

In addition, similar to the positive lens L11, the positive lens 39 has absolute values of the radii of curvature of both lens surfaces that are equal.

In addition, similar to the negative lens L5, the lens surface of the negative lens L33 on the image side is an aspheric surface.

In addition, similar to the positive lens L8, the both lens surfaces of the positive lens L36 are aspheric surfaces.

In the zoom lens 102, as shown schematically by the arrows in FIG. 3, when changing magnification from the wide-angle end to the telephoto end while focusing on a point at infinity, the first lens group G1 moves along the optical axis on a convex locus towards the image side, the second lens group G2 moves along the optical axis on a convex locus towards the image side, the third lens group G3 moves along the optical axis monotonically towards the object side, the fourth lens group G4 moves along the optical axis monotonically towards the object side, and the fifth lens group G5 moves along the optical axis on a convex locus towards the object side.

As shown in FIG. 3, the position of the first lens group G1 at the telephoto end is more towards the object side than the wide-angle end, and the position of the second lens group G3 at the telephoto end is more towards the object side than the wide-angle end. The third lens group G3 moves integrally with the aperture stop towards the object side.

In addition, by extending the fifth lens group G5 towards the object side, it is possible to focus on an object that is nearby. Concretely, in the case of the example 3 described below, in order to change from the focus on a point at infinity to 0.2 m at the wide-angle end, the fifth lens group G5 is extended towards the object so that the distance between the fourth lens group G4 and the fifth lens group G5 changes from 2.429 mm to 2.000 mm. In addition, in order to change from the focus on a point at infinity to 0.2 m at the telephoto end, the fifth lens group G5 is extended towards the object such that the distance between the fourth lens group G4 and the fifth lens group G5 changes from 15.213 mm to 8.967 mm.

Note that in the first embodiment, by making the amount of the extension while focusing larger than the concrete example, it is possible to focus more nearby.

In addition, in the explanation given above, when changing the magnification from the wide-angle end to the telephoto end while focusing on a point at infinity, an example was explained in which the first lens group G1 is moved along the optical axis on a convex locus towards the image side, but the lens group G1 is moved along the optical axis monotonically towards the object.

In addition, the configuration of the lenses within a group in the example described above is one example, and for example, if the positive and negative powers of each of the lens groups can be obtained, the configuration within a group can be changed. For example, the number of lenses within a group can be increased. Thereby, because the share of the aberration compensation of each of the lenses is decreased, it is possible to compensate the aberration ion more advantageously.

In addition, in the first embodiment described above, preferably a configuration is used in which each of the conditional expressions are appropriately combined and satisfied.

In addition, in the explanation given above, when changing magnification from the wide-angle end to the telephoto end, an example was explained in which each of the lens groups move such that the spacing between each of the lenses changes, but depending on the zoom ratio and the like, it is also possible that only at least the first through third lens groups are moved.

EXAMPLE 1

The configuration parameters of the optical system in the first numerical example, which corresponds to the zoom lens in the first embodiment described above, is shown below. Note that below, in addition to the reference symbols explained above, the following symbols are used (they are common to all of the examples): f is the total focal length, FNO is the F number, ω is the half angle of view, W is the wide-angle end, S is the intermediate state, and T is the telephoto end. $r_1, r_2 \ldots$, are the radii of curvature of each lens surface, $d_1, d_2, \ldots$, are the spacing between the adjacent lens surfaces, $n_{d1}, n_{d2}, \ldots,$ are the d-line refractive indices of each lens element, $\nu_{d1}, \nu_{d2}, \ldots,$ are the Abbe number of each lens element, and respectively correspond to the symbols in FIG. 1. The refractive index is noted with respect to the d-line (wavelength 587.56 nm). These notations are common to all of the figures that are referred to below.

Note that the aspheric surface shape is represented by the following equation a when z denotes the direction of theoptical axis and y denotes the direction perpendicular to the optical axis:

$$z = (y^2/r)/[1+\sqrt{1-(1+K)\cdot(y/r)^2}] + A_4 y^4 + A_6 y^6 + A_8 y^8 + A_{10} y^{10} \quad (a)$$

where r is the paraxial radius of curvature, K is the conical coefficient, and $A_4$, $A_6$, $A_8$, and $A_{10}$ are respectively the fourth, sixth, eighth, and tenth aspheric coefficients.

| surface number | radii of curvature | distance between surfaces | refractive index | Abbe number |
|---|---|---|---|---|
| 1 | $r_1 = 92.984$ | $d_1 = 2.30$ | $n_{d1} = 1.84666$ | $\nu_{d1} = 23.78$ |
| 2 | $r_2 = 53.176$ | $d_2 = 5.56$ | $n_{d2} = 1.48749$ | $\nu_{d2} = 70.23$ |
| 3 | $r_3 = 633.665$ | $d_3 = 0.20$ | | |
| 4 | $r_4 = 36.654$ | $d_4 = 5.26$ | $n_{d3} = 1.72916$ | $\nu_{d3} = 54.68$ |
| 5 | $r_5 = 119.187$ | $d_5 =$ (variable) | | |
| 6 | $r_6 = 49.090$ | $d_6 = 1.70$ | $n_{d4} = 1.77250$ | $\nu_{d4} = 49.60$ |
| 7 | $r_7 = 10.001$ | $d_7 = 2.75$ | | |
| 8 | $r_8 = 16.722$ | $d_8 = 1.50$ | $n_{d5} = 1.58313$ | $\nu_{d5} = 59.46$ |
| 9 | $r_9 = 8.732$ (aspheric surface) | $d_9 = 5.24$ | | |
| 10 | $r_{10} = -14.056$ | $d_{10} = 1.00$ | $n_{d6} = 1.49700$ | $\nu_{d6} = 81.54$ |
| 11 | $r_{11} = 50.111$ | $d_{11} = 0.20$ | | |
| 12 | $r_{12} = 27.235$ | $d_{12} = 2.47$ | $n_{d7} = 1.84666$ | $\nu_{d7} = 23.78$ |
| 13 | $r_{13} = -101.004$ | $d_{13} =$ (variable) | | |
| 14 | $r_{14} = \infty$ (stop) | $d_{14} = 1.05$ | | |
| 15 | $r_{15} = 16.683$ (aspheric surface) | $d_{15} = 4.00$ | $n_{d8} = 1.69350$ | $\nu_{d8} = 53.20$ |
| 16 | $r_{16} = 124.749$ (aspheric surface) | $d_{16} = 1.98$ | | |
| 17 | $r_{17} = -44.242$ | $d_{17} = 2.06$ | $n_{d9} = 1.52249$ | $\nu_{d9} = 59.84$ |
| 18 | $r_{18} = -16.226$ | $d_{18} = 2.28$ | | |
| 19 | $r_{19} = -111.996$ | $d_{19} = 1.00$ | $n_{d10} = 1.84666$ | $\nu_{d10} = 23.78$ |
| 20 | $r_{20} = 15.401$ | $d_{20} = 4.45$ | $n_{d11} = 1.49700$ | $\nu_{d11} = 81.54$ |
| 21 | $r_{21} = -15.401$ | $d_{21} =$ (variable) | | |
| 22 | $r_{22} = 37.023$ | $d_{22} = 2.44$ | $n_{d12} = 1.84666$ | $\nu_{d12} = 23.78$ |
| 23 | $r_{23} = -37.023$ | $d_{23} = 0.40$ | | |
| 24 | $r_{24} = -30.255$ | $d_{24} = 1.20$ | $n_{d13} = 1.80100$ | $\nu_{d13} = 34.97$ |
| 25 | $r_{25} = 30.255$ | $d_{25} =$ (variable) | | |
| 26 | $r_{26} = 17.520$ | $d_{26} = 3.28$ | $n_{d14} = 1.49700$ | $\nu_{d14} = 81.54$ |
| 27 | $r_{27} = -101.995$ | $d_{27} = 1.77$ | | |
| 28 | $r_{28} = -72.328$ | $d_{28} = 1.21$ | $n_{d15} = 1.71736$ | $\nu_{d15} = 29.52$ |
| 29 | $r_{29} = \infty$ | $d_{29} =$ (variable) | | |
| 30 | $r_{30} = \infty$ | $d_{30} = 0.80$ | $n_{d16} = 1.51633$ | $\nu_{d16} = 64.14$ |
| 31 | $r_{31} = \infty$ | $d_{31} = 0.92$ | $n_{d17} = 1.54771$ | $\nu_{d17} = 62.84$ |
| 32 | $r_{32} = \infty$ | $d_{32} = 0.80$ | | |
| 33 | $r_{33} = \infty$ | $d_{33} = 0.50$ | $n_{d18} = 1.51633$ | $\nu_{d18} = 64.14$ |
| 34 | $r_{34} = \infty$ | $d_{34} = 0.99$ | | |
| I | $\infty$ (image plane) | | | |

(Aspheric surface coefficients)

| surface number | K | $A_4$ | $A_6$ | $A_8$ | $A_{10}$ |
|---|---|---|---|---|---|
| 9 | 0.00 | $-7.81840 \times 10^{-5}$ | $-1.49680 \times 10^{-6}$ | $1.66070 \times 10^{-8}$ | $-3.06090 \times 10^{-10}$ |
| 15 | 0.00 | $-4.88100 \times 10^{-6}$ | $-1.47920 \times 10^{-6}$ | $3.24640 \times 10^{-8}$ | $-5.72740 \times 10^{-10}$ |
| 16 | 0.00 | $1.11422 \times 10^{-4}$ | $-1.38829 \times 10^{-6}$ | $2.48696 \times 10^{-8}$ | $-4.72103 \times 10^{-10}$ |

(zoom data($\infty$))

| | W | S | T |
|---|---|---|---|
| f (mm) | 7.27 | 15.95 | 34.94 |
| F N O | 2.44 | 2.82 | 3.57 |
| $\omega$ (°) | 38.19 | 18.84 | 8.83 |
| $d_5$ | 0.50 | 13.75 | 25.02 |
| $d_{13}$ | 18.50 | 7.14 | 2.00 |
| $d_{21}$ | 1.39 | 3.92 | 7.46 |
| $d_{25}$ | 2.41 | 3.95 | 14.01 |
| $d_{29}$ | 4.81 | 7.68 | 5.70 |

Figure 4A:
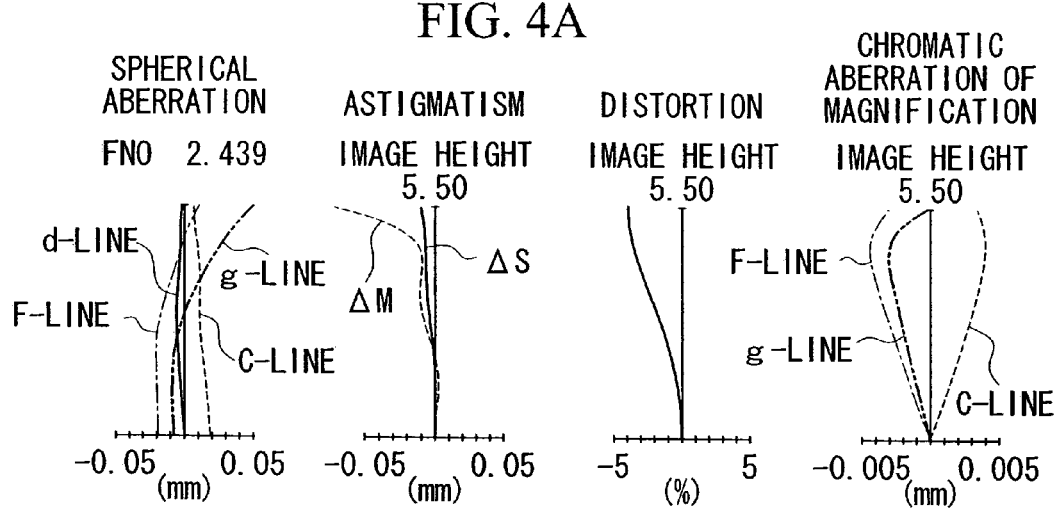
FIGS. 4A, 4B, and 4C are aberration diagrams corresponding to the wide-angle end, the intermediate state, and the telephoto end in the first example.
Figure 4B:
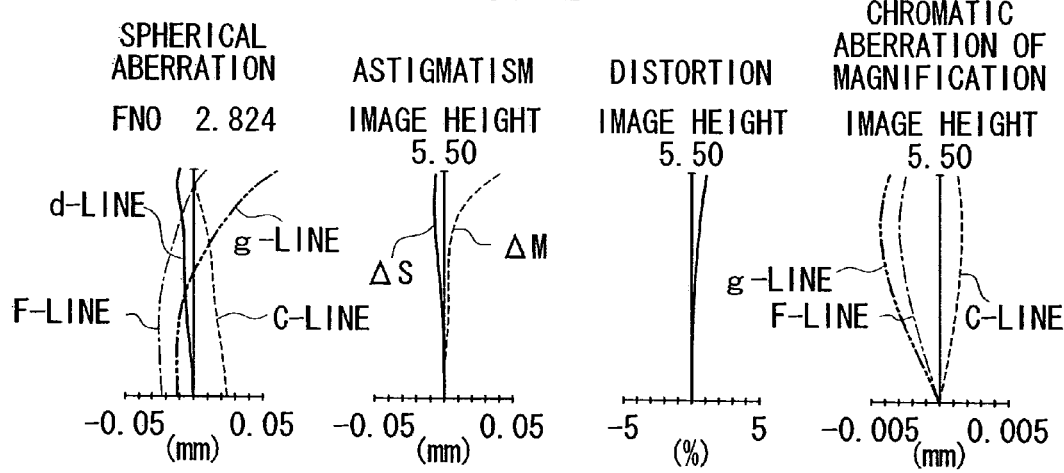
Figure 4C:
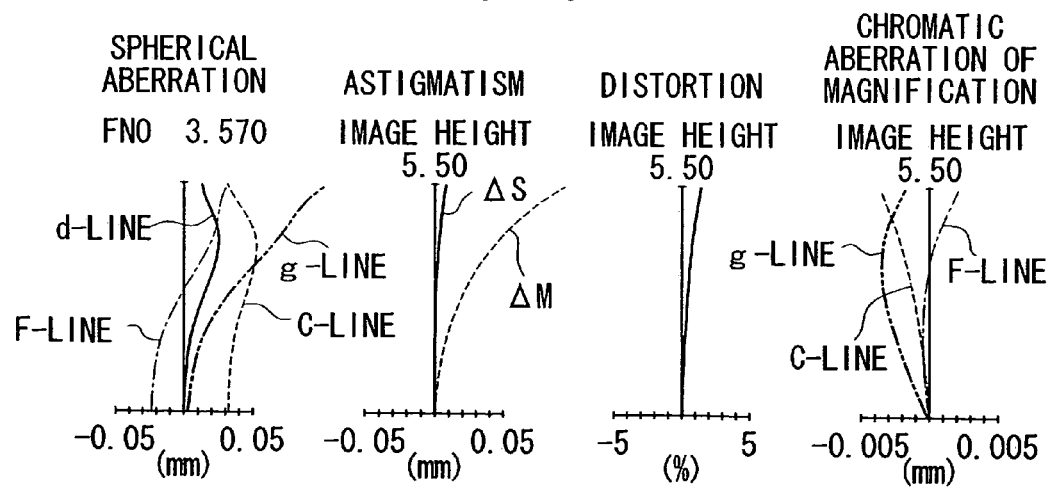

The aberration diagrams for the present example are shown in FIGS. 4A, 4B, and 4C. Each of these figures corresponds to the wide-angle end (W, refer to FIG. 1), the intermediate state (S), and the telephoto end (T). In addition, the figures, in order from the left, are the spherical aberration diagram, the astigmatism diagram, the distortion diagram, and the chromatic aberration of magnification diagram. The units of the respective abscissa are mm, mm, %, and mm.

Thereby, in the present example, it is understood that each of the aberrations are advantageously compensated.

Note that the calculated values corresponding to conditional expressions described above have been summarized below.

EXAMPLE 2

The configuration parameters of the optical system in the second numerical example, which corresponds to the zoom lens (refer to FIG. 2) in the second embodiment described above, is shown below.

| surface number | radii of curvature | distance between surfaces | refractive index | Abbe number |
|---|---|---|---|---|
| 1 | $r_1 = 89.651$ | $d_1 = 2.30$ | $n_{d1} = 1.84666$ | $\nu_{d1} = 23.78$ |
| 2 | $r_2 = 52.004$ | $d_2 = 5.52$ | $n_{d2} = 1.48749$ | $\nu_{d2} = 70.23$ |
| 3 | $r_3 = 472.156$ | $d_3 = 0.20$ | | |
| 4 | $r_4 = 36.878$ | $d_4 = 5.25$ | $n_{d3} = 1.72916$ | $\nu_{d3} = 54.68$ |
| 5 | $r_5 = 122.645$ | $d_5 =$ (variable) | | |
| 6 | $r_6 = 48.967$ | $d_6 = 1.70$ | $n_{d4} = 1.77250$ | $\nu_{d4} = 49.60$ |
| 7 | $r_7 = 10.000$ | $d_7 = 2.75$ | | |
| 8 | $r_8 = 16.700$ | $d_8 = 1.50$ | $n_{d5} = 1.58313$ | $\nu_{d5} = 59.46$ |
| 9 | $r_9 = 8.723$ (aspheric surface) | $d_9 = 5.23$ | | |
| 10 | $r_{10} = -14.070$ | $d_{10} = 1.00$ | $n_{d6} = 1.49700$ | $\nu_{d6} = 81.54$ |
| 11 | $r_{11} = 51.774$ | $d_{11} = 0.20$ | | |
| 12 | $r_{12} = 27.208$ | $d_{12} = 2.46$ | $n_{d7} = 1.84666$ | $\nu_{d7} = 23.78$ |
| 13 | $r_{13} = -104.437$ | $d_{13} =$ (variable) | | |
| 14 | $r_{14} = \infty$ (stop) | $d_{14} = 1.05$ | | |
| 15 | $r_{15} = 16.704$ (aspheric surface) | $d_{15} = 3.99$ | $n_{d8} = 1.69350$ | $\nu_{d8} = 53.20$ |
| 16 | $r_{16} = 122.028$ (aspheric surface) | $d_{16} = 2.00$ | | |
| 17 | $r_{17} = -43.999$ | $d_{17} = 2.06$ | $n_{d9} = 1.52249$ | $\nu_{d9} = 59.84$ |
| 18 | $r_{18} = -16.227$ | $d_{18} = 2.28$ | | |
| 19 | $r_{19} = -114.732$ | $d_{19} = 1.00$ | $n_{d10} = 1.84666$ | $\nu_{d10} = 23.78$ |
| 20 | $r_{20} = 15.402$ | $d_{20} = 4.45$ | $n_{d11} = 1.49700$ | $\nu_{d11} = 81.54$ |
| 21 | $r_{21} = -15.402$ | $d_{21} =$ (variable) | | |
| 22 | $r_{22} = 37.349$ | $d_{22} = 2.43$ | $n_{d12} = 1.84666$ | $\nu_{d12} = 23.78$ |
| 23 | $r_{23} = -37.349$ | $d_{23} = 0.45$ | | |
| 24 | $r_{24} = -30.433$ | $d_{24} = 1.20$ | $n_{d13} = 1.80100$ | $\nu_{d13} = 34.97$ |
| 25 | $r_{25} = 30.433$ | $d_{25} =$ (variable) | | |
| 26 | $r_{26} = 17.283$ | $d_{26} = 3.15$ | $n_{d14} = 1.49700$ | $\nu_{d14} = 81.54$ |
| 27 | $r_{27} = -270.000$ | $d_{27} = 2.50$ | | |
| 28 | $r_{28} = -98.292$ | $d_{28} = 1.21$ | $n_{d15} = 1.84666$ | $\nu_{d15} = 23.78$ |
| 29 | $r_{29} = -672.762$ | $d_{29} =$ (variable) | | |
| 30 | $r_{30} = \infty$ | $d_{30} = 0.80$ | $n_{d16} = 1.51633$ | $\nu_{d16} = 64.14$ |
| 31 | $r_{31} = \infty$ | $d_{31} = 0.92$ | $n_{d17} = 1.54771$ | $\nu_{d17} = 62.84$ |
| 32 | $r_{32} = \infty$ | $d_{32} = 0.80$ | | |
| 33 | $r_{33} = \infty$ | $d_{33} = 0.50$ | $n_{d18} = 1.51633$ | $\nu_{d18} = 64.14$ |
| 34 | $r_{34} = \infty$ | $d_{34} = 0.99$ | | |
| I | $\infty$ (image plane) | | | |

(aspheric surface coefficients)

| surface number | K | $A_4$ | $A_6$ | $A_8$ | $A_{10}$ |
|---|---|---|---|---|---|
| 9 | 0.00 | $-7.72827 \times 10^{-5}$ | $-1.56396 \times 10^{-6}$ | $1.78948 \times 10^{-8}$ | $-3.19839 \times 10^{-10}$ |
| 15 | 0.00 | $-4.81139 \times 10^{-6}$ | $-1.52549 \times 10^{-6}$ | $3.27800 \times 10^{-8}$ | $-5.58433 \times 10^{-10}$ |
| 16 | 0.00 | $1.11137 \times 10^{-4}$ | $-1.38855 \times 10^{-6}$ | $2.22164 \times 10^{-8}$ | $-3.97402 \times 10^{-10}$ |

(zoom data($\infty$))

| | W | S | T |
|---|---|---|---|
| f (mm) | 7.27 | 15.95 | 34.94 |
| F N O | 2.44 | 2.83 | 3.57 |
| $\omega$ (°) | 38.21 | 18.85 | 8.84 |
| $d_5$ | 0.50 | 13.75 | 25.05 |
| $d_{13}$ | 18.61 | 7.21 | 2.00 |
| $d_{21}$ | 1.44 | 3.91 | 7.22 |
| $d_{25}$ | 2.42 | 4.01 | 14.16 |
| $d_{29}$ | 4.14 | 7.03 | 5.18 |

Figure 5A:
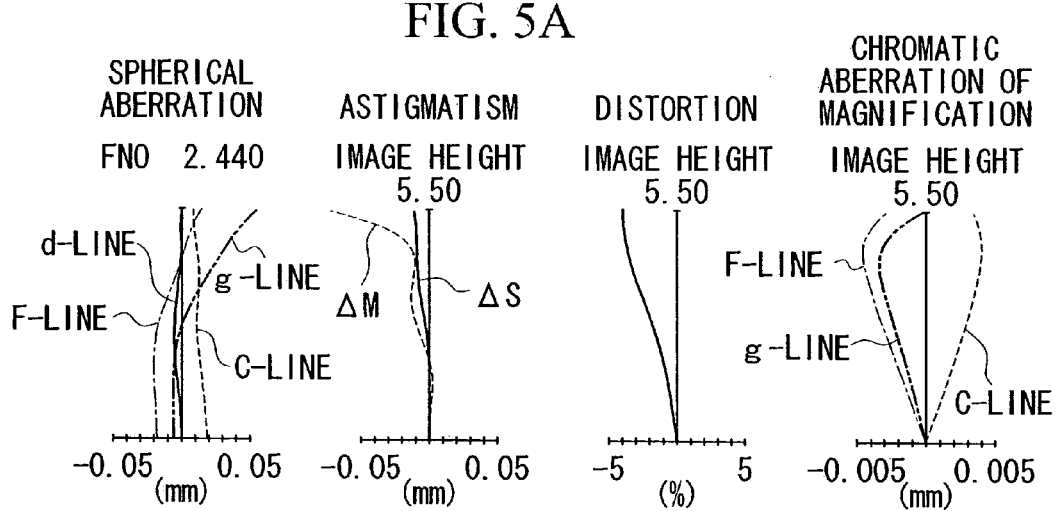
FIGS. 5A, 5B, and 5C are aberration diagrams corresponding to the wide-angle end, the intermediate state, and the telephoto end in the second example.
Figure 5B:
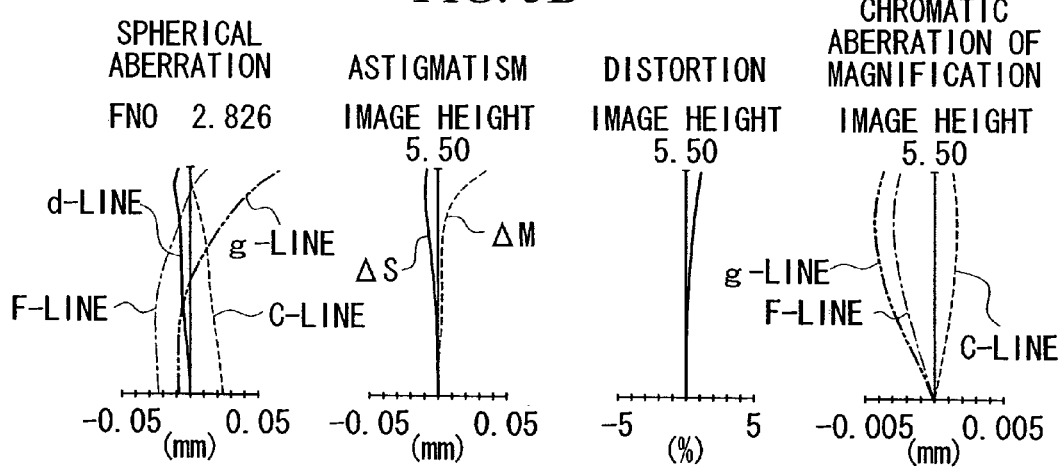
Figure 5C:
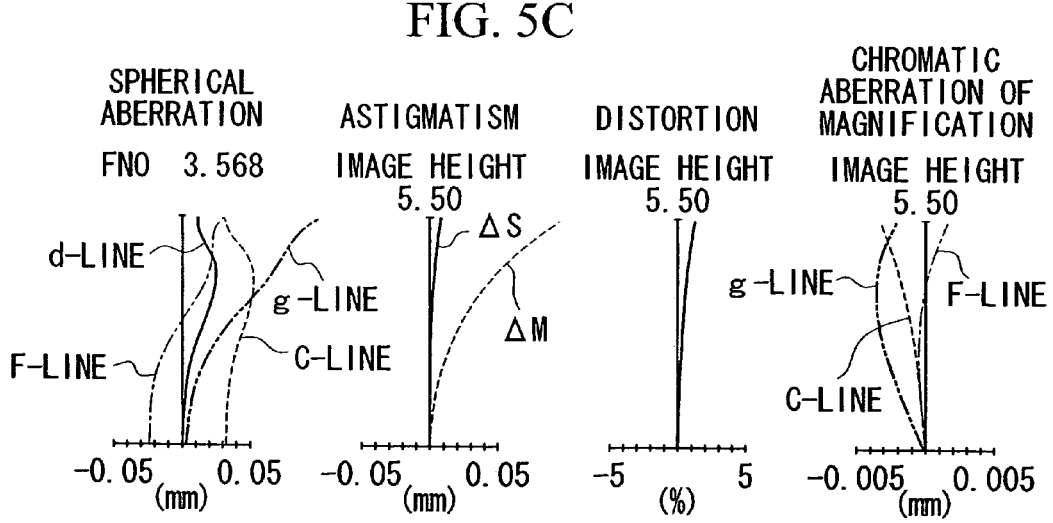

The aberration diagrams in the present example are shown in FIGS. 5A, 5B, and 4C. Each of these figures corresponds to the wide-angle end (W; refer to FIG. 2), intermediate state (S), telephoto end (T). The meanings of each of the figures are identical to those in FIG. 4.

Thereby, in the present example, it is understood that each of the aberrations are advantageously compensated.

Note that calculated values corresponding to the conditional expressions described above are summarized below.

EXAMPLE 3

The configuration parameters of the optical system in the third numerical example, which corresponds to the zoom lens (refer to FIG. 3) in the third embodiment described above, is shown below.

| surface number | radii of curvature | distance between surfaces | refractive index | Abbe number |
|---|---|---|---|---|
| 1 | $r_1 = 122.912$ | $d_1 = 2.30$ | $n_{d1} = 1.84666$ | $\nu_{d1} = 23.78$ |
| 2 | $r_2 = 61.695$ | $d_2 = 5.66$ | $n_{d2} = 1.48749$ | $\nu_{d2} = 70.23$ |
| 3 | $r_3 = -672.762$ | $d_3 = 0.20$ | | |
| 4 | $r_4 = 34.035$ | $d_4 = 5.20$ | $n_{d3} = 1.72916$ | $\nu_{d3} = 54.68$ |
| 5 | $r_5 = 94.277$ | $d_5 = $ (variable) | | |
| 6 | $r_6 = 46.482$ | $d_6 = 1.70$ | $n_{d4} = 1.77250$ | $\nu_{d4} = 49.60$ |
| 7 | $r_7 = 10.000$ | $d_7 = 2.71$ | | |
| 8 | $r_8 = 16.700$ | $d_8 = 1.50$ | $n_{d5} = 1.58313$ | $\nu_{d5} = 59.46$ |
| 9 | $r_9 = 8.649$ (aspheric surface) | $d_9 = 5.22$ | | |
| 10 | $r_{10} = -14.064$ | $d_{10} = 1.00$ | $n_{d6} = 1.49700$ | $\nu_{d6} = 81.54$ |
| 11 | $r_{11} = 44.051$ | $d_{11} = 0.20$ | | |
| 12 | $r_{12} = 26.357$ | $d_{12} = 2.48$ | $n_{d7} = 1.84666$ | $\nu_{d7} = 23.78$ |
| 13 | $r_{13} = -101.808$ | $d_{13} = $ (variable) | | |
| 14 | $r_{14} = \infty$ (stop) | $d_{14} = 1.05$ | | |
| 15 | $r_{15} = 17.190$ (aspheric surface) | $d_{15} = 3.89$ | $n_{d8} = 1.69350$ | $\nu_{d8} = 53.20$ |
| 16 | $r_{16} = 216.123$ (aspheric surface) | $d_{16} = 2.26$ | | |
| 17 | $r_{17} = -31.423$ | $d_{17} = 2.00$ | $n_{d9} = 1.52249$ | $\nu_{d9} = 59.84$ |
| 18 | $r_{18} = -15.377$ | $d_{18} = 2.07$ | | |
| 19 | $r_{19} = -151.834$ | $d_{19} = 1.00$ | $n_{d10} = 1.84666$ | $\nu_{d10} = 23.78$ |
| 20 | $r_{20} = 15.487$ | $d_{20} = 4.52$ | $n_{d11} = 1.49700$ | $\nu_{d11} = 81.54$ |
| 21 | $r_{21} = -15.487$ | $d_{21} = $ (variable) | | |
| 22 | $r_{22} = 40.466$ | $d_{22} = 2.37$ | $n_{d12} = 1.84666$ | $\nu_{d12} = 23.78$ |
| 23 | $r_{23} = -40.466$ | $d_{23} = 0.29$ | | |
| 24 | $r_{24} = -33.478$ | $d_{24} = 1.00$ | $n_{d13} = 1.80100$ | $\nu_{d13} = 34.97$ |
| 25 | $r_{25} = 35.225$ | $d_{25} = $ (variable) | | |
| 26 | $r_{26} = 17.976$ | $d_{26} = 3.01$ | $n_{d14} = 1.49700$ | $\nu_{d14} = 81.54$ |
| 27 | $r_{27} = -561.164$ | $d_{27} = 2.50$ | | |
| 28 | $r_{28} = -98.732$ | $d_{28} = 1.66$ | $n_{d15} = 1.84666$ | $\nu_{d15} = 23.78$ |
| 29 | $r_{29} = -672.762$ | $d_{29} = $ (variable) | | |
| 30 | $r_{30} = \infty$ | $d_{30} = 0.80$ | $n_{d16} = 1.51633$ | $\nu_{d16} = 64.14$ |
| 31 | $r_{31} = \infty$ | $d_{31} = 0.92$ | $n_{d17} = 1.54771$ | $\nu_{d17} = 62.84$ |
| 32 | $r_{32} = \infty$ | $d_{32} = 0.80$ | | |
| 33 | $r_{33} = \infty$ | $d_{33} = 0.50$ | $n_{d18} = 1.51633$ | $\nu_{d18} = 64.14$ |
| 34 | $r_{34} = \infty$ | $d_{34} = 1.00$ | | |
| I | $\infty$ (image surface) | | | |

(aspheric surface coefficients)

| surface number | K | $A_4$ | $A_6$ | $A_8$ | $A_{10}$ |
|---|---|---|---|---|---|
| 9 | 0.00 | $-6.77197 \times 10^{-5}$ | $-2.14845 \times 10^{-6}$ | $3.04835 \times 10^{-8}$ | $-3.99201 \times 10^{-10}$ |
| 15 | 0.00 | $-5.26118 \times 10^{-6}$ | $-9.17773 \times 10^{-7}$ | $-1.78100 \times 10^{-9}$ | $9.24603 \times 10^{-11}$ |
| 16 | 0.00 | $1.08903 \times 10^{-4}$ | $-9.24134 \times 10^{-7}$ | $-3.58516 \times 10^{-9}$ | $1.16662 \times 10^{-10}$ |

(zoom data($\infty$))

| | W | S | T |
|---|---|---|---|
| f (mm) | 7.27 | 15.94 | 34.94 |
| F N O | 2.41 | 2.77 | 3.57 |
| $\omega$ (°) | 38.21 | 18.92 | 8.84 |
| $d_5$ | 0.50 | 13.75 | 24.19 |
| $d_{13}$ | 18.40 | 7.22 | 2.00 |
| $d_{21}$ | 1.00 | 3.95 | 7.84 |
| $d_{25}$ | 2.43 | 3.72 | 15.21 |
| $d_{29}$ | 4.84 | 7.45 | 4.44 |

Figure 6A:
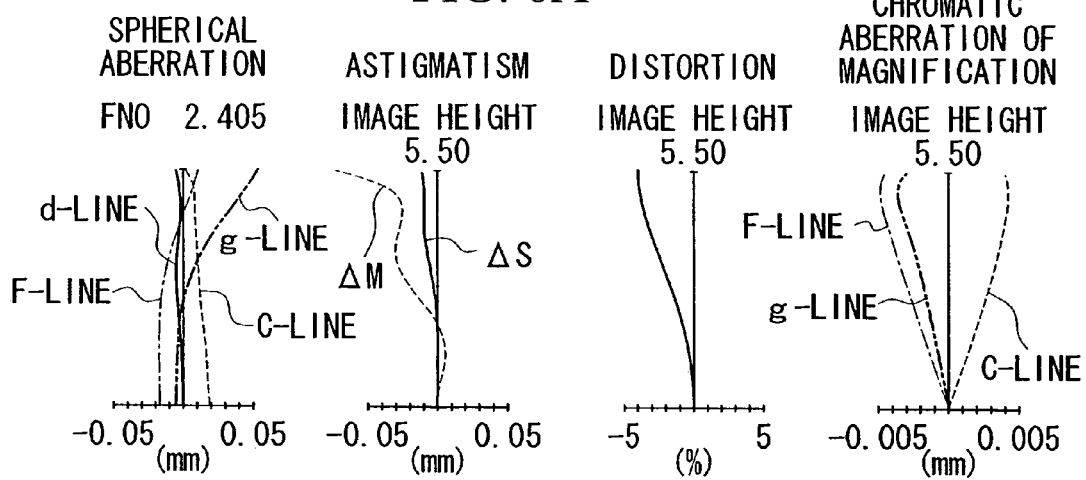
FIGS. 6A, 6B, and 6C are aberration diagrams corresponding to the wide-angle end, the intermediate state, and the telephoto end in the third example.
Figure 6B:
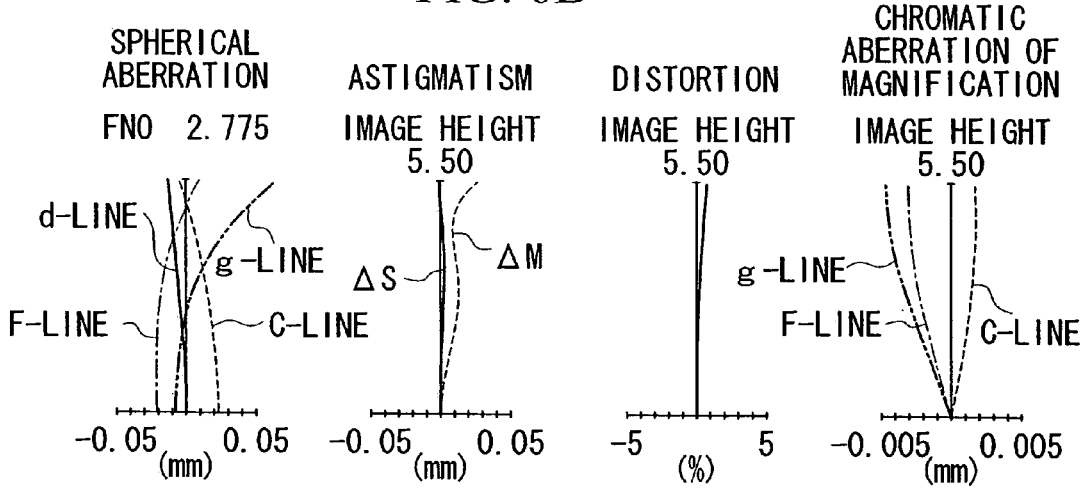
Figure 6C:
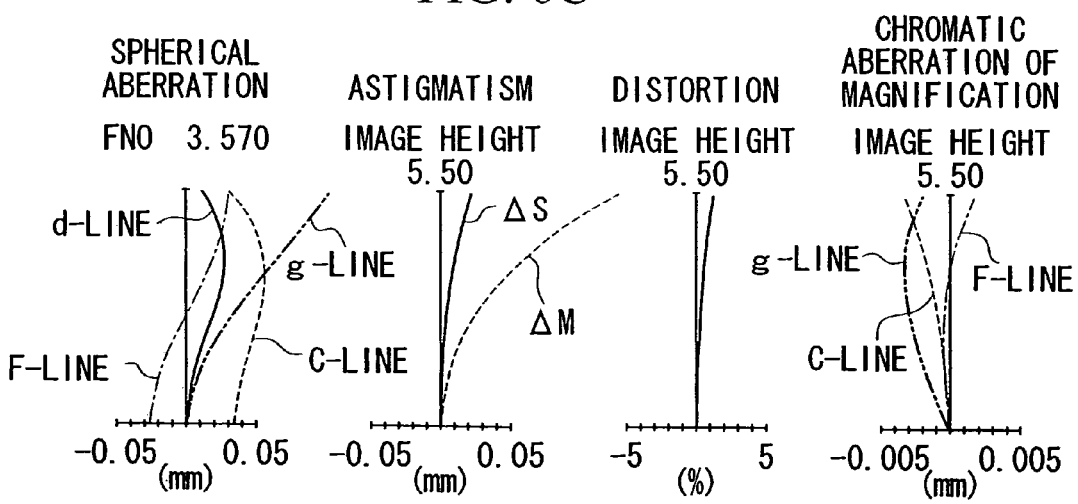

The aberration diagrams for the present example are shown in FIGS. 6A, 6B, and 6C. Each of the respective diagrams corresponds to the wide-angle end (W; refer to FIG. 7), the intermediate state (S), and the telephoto end (T). The meanings in each of the figures are identical to those of FIG. 4.

Thereby, it is understood that each of the aberrations can be advantageously compensated.

The calculated values of the amounts in the examples 1 to 3 described above and the values of each of the conditional expressions are shown in the following Table 1.

TABLE 1

| Groups | | Conditional Expression | Example 1 | Example 2 | Example 3 |
|---|---|---|---|---|---|
| $d_{2iw}$ | (mm) | | 73.32 | 72.457 | 72.349 |
| $d_{2it}$ | (mm) | | 74.396 | 74.412 | 75.175 |
| $f_w$ | (mm) | | 7.272 | 7.27 | 7.27 |
| $f_1$ | (mm) | | 64.279 | 64.467 | 62.99 |
| $f_2$ | (mm) | | −9.776 | −9.79 | −9.767 |
| $f_3$ | (mm) | | 19.883 | 19.912 | 19.99 |
| $f_4$ | (mm) | | −200.01 | −200.01 | −300 |
| $f_5$ | (mm) | | 41.3 | 41.463 | 45.307 |
| IH | (mm) | | 5.5 | 5.5 | 5.5 |
| $L_w$ | (mm) | | 86.14 | 86.225 | 86.218 |
| $B\ f_w$ | (mm) | | 8.049 | 7.385 | 8.09 |
| $r_{4r}$ | (mm) | | 30.255 | 30.433 | 35.225 |
| $r_{5r}$ | (mm) | | 17.52 | 17.283 | 17.976 |
| $(d_{2it} - d_{2iw})/d_{2iw}$ | | (1) | 0.029 | 0.027 | 0.039 |
| $f_1/f_w$ | | (2) | 8.839 | 8.867 | 8.664 |
| $f_2/f_w$ | | (3) | −1.344 | −1.347 | −1.343 |
| $f_3/f_w$ | | (4) | 2.734 | 2.739 | 2.75 |
| $f_4/f_w$ | | (5) | −27.504 | −27.511 | −41.264 |
| $f_5/f_w$ | | (6) | 5.679 | 5.703 | 6.232 |
| $V_{d1p}$ | | (7) | 70.23 | 70.23 | 70.23 |
| $V_{d1n}$ | | (8) | 23.78 | 23.78 | 23.78 |
| $V_{d2p}$ | | (9) | 23.78 | 23.78 | 23.78 |
| $V_{d2n}$ | | (10) | 81.54 | 81.54 | 81.54 |
| $V_{d3p}$ | | (11) | 81.54 | 81.54 | 81.54 |
| $V_{d3n}$ | | (12) | 23.78 | 23.78 | 23.78 |
| $L_w/IH$ | | (13) | 15.662 | 15.677 | 15.676 |
| $B\ f_w/L_w$ | | (14) | 0.093 | 0.086 | 0.094 |
| $\|IH/r_{4r}\|$ | | (15) | 0.182 | 0.181 | 0.156 |
| $\|IH/r_{5r}\|$ | | (16) | 0.314 | 0.318 | 0.306 |
| $d_{2it}/d_{2iw}$ | | (21) | 1.028 | 1.027 | 1.039 |
| $\{(d_{3t} + d_{4t}) - (d_{3w} + d_{4w})\}/(f_t/f_w)$ | | (22) | 3.67 | 3.64 | 4.08 |
| $(r_{3f} + r_{3r})/(r_{3f} - r_{3r})$ | | (23) | −1.309 | −1.317 | −1.086 |

According to the described above, the examples. 1 through 3 satisfy all of the conditional expressions (1) to (16), and (21) to (23). The conditional expressions (1b) to (16b) and (21b) to (23b), which are the more preferably ranges, are also satisfied.

Second Embodiment

Next, a camera according to a second embodiment of the present invention will be explained.

The zoom lens according to the first embodiment of the present invention as described above can be used on an image pick-up apparatus, in which an object image is formed by a zoom lens and this image is received and picked-up at an electric pick-up element such as a CCD for example a digital camera, and video camera. Furthermore, the zoom lens can be used on an information processing apparatuses such as a personal computer, a telephone for example a potable telephone that is convenient to carry. An embodiment thereof will be illustrated below.

Figure 7:
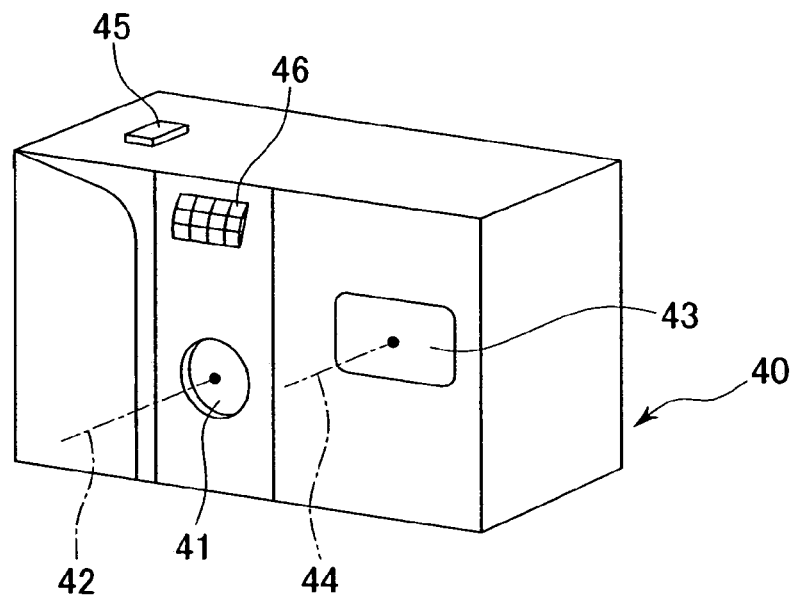
FIG. 7 is a conceptual diagram of the forward perspective view showing the external appearance of a digital camera that has incorporated the zoom lens according to the present invention.
Figure 8:
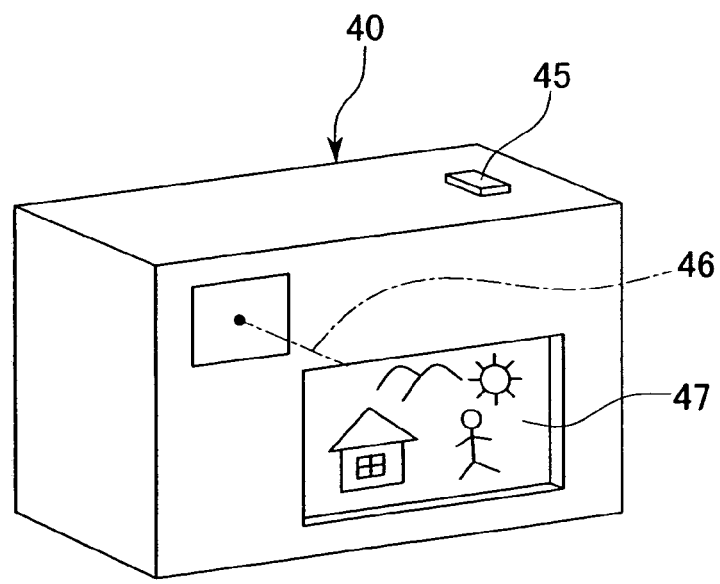
FIG. 8 is a conceptual diagram of a backward perspective view of the same.
Figure 9:
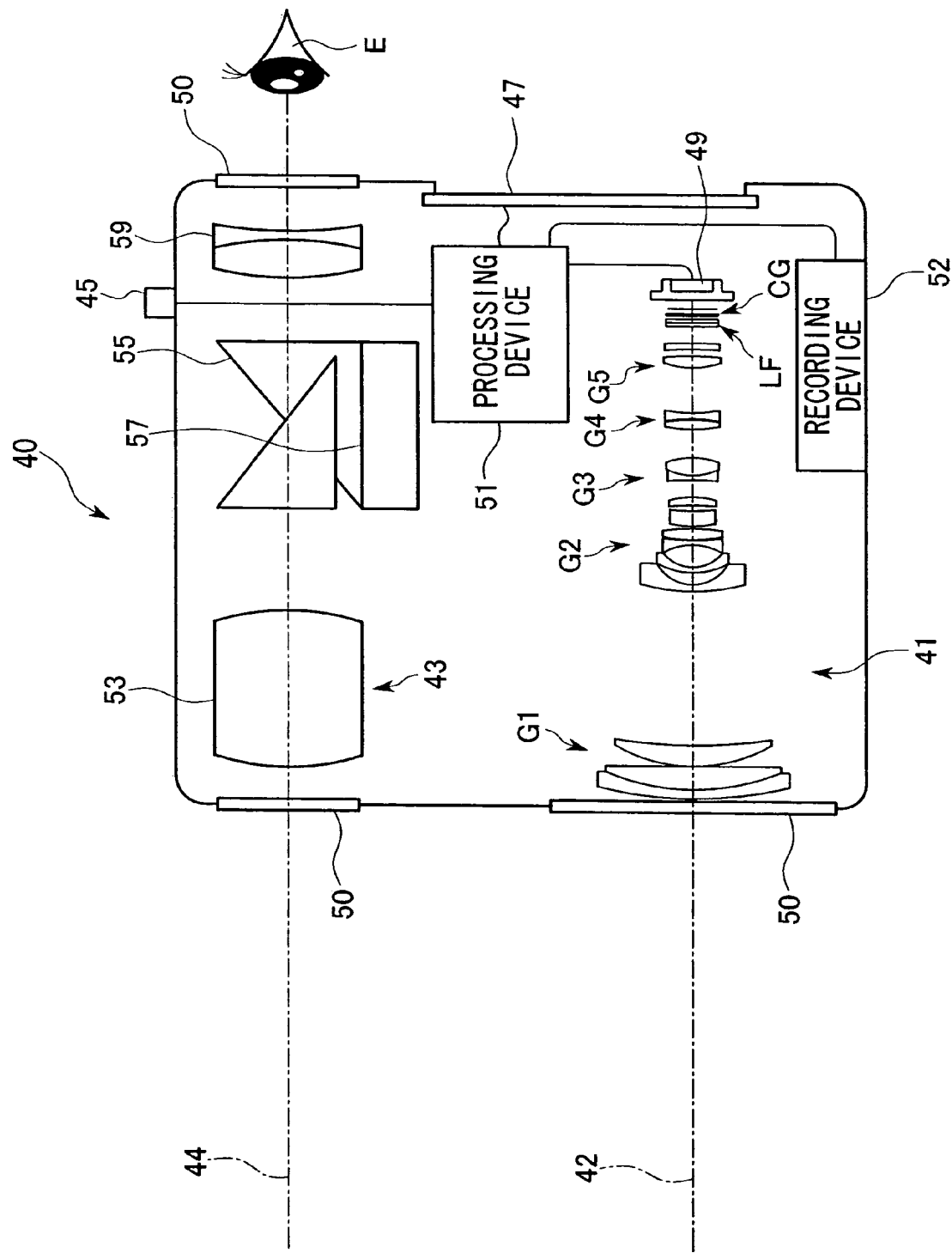
FIG. 9 is a cross-sectional conceptual drawing for showing the structure of a digital camera that has incorporated the zoom lens according to the present invention.

In the case of this example, FIG. 7 to 9, show schematic drawings of the structure in which the zoom lens according to the present invention is incorporated into the optical image pick-up system 41 of a digital camera. FIG. 7 is a frontal perspective diagram showing the external appearance of the digital camera 40, FIG. 8 is a rear perspective view of the same, and FIG. 9 is a cross-sectional drawing showing the structure of the digital camera 40.

In the case of this example, the digital camera 40 (camera) includes an optical image pick-up system 41 (zoom lens) that has an image pick-up light path 42, a finder optical system 43 that has a finder optical path 44, a shutter 45, a flash 46, a crystal display monitor 47, and the like. When the shutter 45 that is disposed on the upper part of the digital camera 40 is pressed, image pick-up is carried out through the optical image pick-up system 41, which communicates therewith, consisting of, for example, the zoom lenses 100, 101, or 102 of the first embodiment. The object image formed by the optical image pick-up system 41 is formed on the image pick-up plane of the CCD 49 (image pick-up element) through an optical low-pass filter LF (F2) and a cover glass CG (GL1). The object image received by this CCD 49 is displayed on the liquid crystal display monitor 47 provided on the back surface of the camera as an electronic image. In addition, a recording device 52 is connected to a processing device 51, and it is possible to record the electronic image that has been picked up. Note that this recording device upstream data transfer device 52 can be provided separately from the processing device upstream data transfer apparatus 51, or structured such that electronic recording and writing is carried out using a floppy (Registered Trademark) disk, a memory card, MO or the like. In addition, instead of the CCD 49, the camera can be structured such as a silver halide camera that has a silver film disposed therein.

Furthermore, a finder object optical system 53 is disposed along the finder optical path 44. The object image formed by the finder object optical system 53 is formed on a field frame 57 of a porro prism 55, which is an image erection member. Behind the porro prism 55, an eyepiece optical system 59 that directs the reverted image to the observer's eye E is disposed. Note that cover members 50 are disposed on the optical image pick-up system 41, the incident side of the viewfinder object optical system 53, and the emitting side of the eyepiece optical system 59.

In the digital camera 40 having such a structure, the optical image pick-up system 41 has a high zoom ratio at the wide-angle end, has advantageous aberration, is bright, and is a large zoom lens with a back focus on which a filter can be disposed. Thus, high performance and cost reductions can be realized.

Note that in the example in FIG. 9, parallel flat plates are disposed as the cover member 50, but a lens with power can also be used.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A zoom lens system comprising, in order from an object side to an image plane side thereof,
   a first lens group having positive refractive power,
   a second lens group having negative refractive power,
   a third lens group having positive refractive power,
   a fourth lens group having negative refractive power, and
   a fifth lens group having positive refractive power,
   wherein:
   all spaces between the lens groups are varied while changing magnification,
   and wherein,
   the second lens group comprises only four lenses, these four lenses consist of, in order from the object side, a first negative lens, a second negative lens, a third negative lens, and a fourth positive lens,
   the third lens group comprises only four lenses, these four lenses consist of, in order from the object side, a first positive lens, a second positive lens, a third negative lens, and a fourth positive lens.

2. A zoom lens system comprising, in order from an object side to an image plane side thereof,
   a first lens group having positive refractive power,
   a second lens group having negative refractive power,
   a third lens group having positive refractive power,
   a fourth lens group having negative refractive power, and
   a fifth lens group having positive refractive power,
   wherein:
   all spaces between the lens groups are varied while changing magnification,
   and wherein,
   the third lens group comprises, in order from the object side:
   a first positive lens having a curvature of an object side surface larger than a curvature of an image side surface,
   a second meniscus positive lens having a object side surface concave to the object side, and
   at least one negative lens.

3. A zoom lens system comprising, in order from an object side to an image plane side thereof,
   a first lens group having positive refractive power,
   a second lens group having negative refractive power,
   a third lens group having positive refractive power,
   a fourth lens group having negative refractive power, and
   a fifth lens group having positive refractive power,
   wherein:
   all spaces between the lens groups are varied while changing magnification,
   and wherein,
   the fifth lens group comprises only two lenses, these two lenses consist of, in order from the object side, a positive lens, and a negative lens having an absolute value of curvature of an object side surface larger than an absolute value of curvature of an image side surface, and
   the positive lens and the negative lens are separated.

4. The zoom lens system according to claim 1, which satisfies the following conditions:

$$1 < d_{2it}/d_{2iw} < 1.6$$

$$3 \text{ mm} < \{(d_{3t}+d_{4t})-(d_{3w}+d_{4w})\}(f_t/f_w) < 6 \text{ mm}$$

where
   $d_{2iw}$ is a distance between an object side surface of the second lens group and an image plane at a wide-angle end,
   $d_{2it}$ is a distance between the object side surface of the second lens group and the image plane at a telephoto end,
   $d_{3w}$ is a spacing between the third lens group and the fourth lens group at a wide-angle end,
   $d_{3t}$ is a spacing between the third lens group and the fourth lens group at the telephoto end,
   $d_{4w}$ is a spacing between the fourth lens group and the fifth lens group at the wide-angle end,
   $d_{4t}$ is a spacing between the fourth lens group and the fifth lens group at the telephoto end,
   $f_t$ is a focal length of the zoom lens system at the telephoto end, and
   $f_w$ is a focal length of the zoom lens system at the wide-angle end.

5. A zoom lens system comprising, in order from an object side to an image plane side thereof:
   a first lens group having positive refractive power,
   a second lens group having negative refractive power,
   a third lens group having positive refractive power,
   a fourth lens group having negative refractive power, and
   a fifth lens group having positive refractive power,
   wherein the first lens group, the second lens group, and the third lens group are moved individually while changing the magnification of the zoom lens system from a wide-angle end to a telephoto end such that
   a distance between the first lens group and the second lens group becomes wide,
   a distance between the second lens group and the third lens group becomes narrow,
   a distance between the third lens group and the fifth lens group becomes wide,
   the second lens group moves in such a way as to arrive at the object side of the zoom lens system at the telephoto end rather than at a wide-angle end, and wherein the zoom lens system satisfies the following conditions:

$$<d_{2it}/d_{2iw}<1.6$$

$$3 \text{ mm} < \{(d_{3t}+d_{4t})-(d_{3w}+d_{4w})\}/(f_t/f_w) < 6 \text{ mm}$$

where $d_{2iw}$ is a distance between an object side surface of the second lens group and an image plane at a wide-angle end, $d_{2it}$ t is a distance between the object side surface of the second lens group and the image plane at a telephoto end, $d_{3w}$ is a spacing between the third lens group and the fourth lens group at a wide-angle end, $d_{3t}$ is a spacing between the third lens group and the fourth lens group at the telephoto end, $d_{4w}$ is a spacing between the fourth lens group and the fifth lens group at the wide-angle end, $d_{4t}$ is a spacing between the fourth lens group and the fifth lens group at the telephoto end, $f_t$ is a focal length of the zoom lens system at the telephoto end, and $f_w$ is a focal length of the zoom lens system at the wide-angle end.

6. The zoom lens system according to claim 5, wherein the zoom lens system includes five lens groups in total.

7. The zoom lens system according to claim 5, wherein the fourth lens group and the fifth lens group are moved individually while changing the magnification of the zoom lens system from the wide-angle end to the telephoto end.

8. The zoom lens system according to claim 5, wherein the second lens group comprises only four lenses, these four lenses consist of, in order from the object side, a first negative lens, a second negative lens, a third negative lens, and a fourth positive lens.

9. The zoom lens system according to claim 5, wherein the third lens group comprises, in order from the object side:
a first positive lens having an absolute value of curvature of an object side surface larger than an absolute value of curvature of an image side surface,
a second meniscus positive lens having a object side surface concave to the object side, and
at least one negative lens.

10. The zoom lens system according to claim 5, wherein the third lens group comprises only four lenses, these four lenses consist of, in order from the object side, a first positive lens, a second positive lens, a third negative lens, and a fourth positive lens.

11. The zoom lens system according to claim 5, wherein the fifth lens group comprises, in order from the object side:
a positive lens, and
a negative lens having an absolute value of curvature of an object side surface larger than an absolute value of curvature of an image side surface, and
the positive lens and the negative lens in the fifth lens group are separated.

12. The zoom lens system according to claim 8, wherein the second lens group has at least one aspheric surface.

13. The zoom lens system according to claim 1, wherein the second lens group has at least one aspheric surface.

14. The zoom lens system according to claim 1, wherein:
the first positive lens in the third lens group is positive meniscus lens having a convex surface convex to the object side, and
the first positive lens has at least one aspheric surface.

15. The zoom lens system according to claim 1, wherein focusing is performed by moving the fifth lens group along an optical axis.

16. The zoom lens system according to claim 1, wherein:
an image side surface of the fourth lens group is a concave surface concave to the image plane side,
an object side surface of the fifth lens group is a convex surface convex to the object side, and
wherein the zoom lens system satisfies the following conditions:

$$|IH/r_{4r}|<0.35$$

$$|IH/r_{5f}|<0.5$$

where $r_{4r}$ is a radius of curvature on the image side surface of the fourth lens group, $r_{5f}$ is a radius of curvature on the object side surface of the fifth lens group, and IH is a maximum image height.

17. A camera comprising a zoom lens system and an image pick up device disposed at the image plane position of the zoom lens system, wherein the zoom lens system comprises, in order from an object side to an image plane side thereof:
a first lens group having positive refractive power,
a second lens group having negative refractive power,
a third lens group having positive refractive power,
a fourth lens group having negative refractive power, and
a fifth lens group having positive refractive power, wherein:
all spaces between the lens groups are varied while changing magnification, and wherein,
the second lens group comprises only four lenses, these four lenses consist of, in order from the object side, a first negative lens, a second negative lens, a third negative lens, and a fourth positive lens,
the third lens group comprises only four lenses, these four lenses consist of, in order from the object side, a first positive lens, a second positive lens, a third negative lens, and a fourth positive lens.

18. A camera comprising a zoom lens system and an image pick up device arranged image plane position of the zoom lens system, wherein the zoom lens system comprises, in order from an object side to an image plane side thereof:
a first lens group having positive refractive power,
a second lens group having negative refractive power,
a third lens group having positive refractive power,
a fourth lens group having negative refractive power, and
a fifth lens group having positive refractive power, wherein:
all spaces between the lens groups are varied while changing magnification, and wherein,
the third lens group comprises, in order from the object side:
a first positive lens having an absolute value of curvature of an object side surface larger than an absolute value of curvature of an image side surface,
a second positive lens having a object side surface concave to the object side, and
at least one negative lens.

19. A camera comprising a zoom lens system and an image pick up device arranged image plane position of the zoom lens system, wherein the zoom lens system comprises, in order from an object side to an image plane side thereof:
a first lens group having positive refractive power,
a second lens group having negative refractive power, a third lens group having positive refractive power,
a fourth lens group having negative refractive power, and
a fifth lens group having positive refractive power,
  wherein:
all spaces between the lens groups are varied while changing magnification, and wherein:
the fifth lens group comprises only two lenses, these two lenses consist of, in order from the object side, a positive lens, and a negative lens having an absolute value of curvature of an object side surface larger than an absolute value of curvature of an image side surface, and
the positive lens and the negative lens are separated.

20. A camera comprising a zoom lens system and an image pick up device arranged image plane position of the zoom lens system, wherein the zoom lens system comprises, in order from an object side to an image plane side thereof:
  a first lens group having positive refractive power,
  a second lens group having negative refractive power,
  a third lens group having positive refractive power,
  a fourth lens group having negative refractive power, and
  a fifth lens group having positive refractive power,
    wherein:
  the first lens group, the second lens group, and the third lens group are moved individually while changing the magnification of the zoom lens system from a wide-angle end to a telephoto end, so that:
  a distance between the first lens group and the second lens group becomes wide
  a distance between the second lens group and the third lens group becomes narrow,
  a distance between the third lens group and the fifth lens group becomes wide, the second lens group moves in such a way as to arrive at the object side of the zoom lens system at the telephoto end rather than at a wide-angle end, and wherein the zoom lens system satisfies the following conditions:

$1 < d_{2it}/d_{2iw} < 1.6$ $3 \text{ mm} < \{(d_{3t}+d_{4t})-(d_{3w}+d_{4w})\}/(f_t/f_w) < 6 \text{ mm}$ where
$d_{2iw}$ is a distance between an object side surface of the second lens group and an image plane at a wide-angle end,
$d_{2it}$ is a distance between the object side surface of the second lens group and the image plane at a telephoto end,
$d_{3w}$ is a spacing between the third lens group and the fourth lens group at a wide-angle end,
$d_{3t}$ is a spacing between the third lens group and the fourth lens group at the telephoto end,
$d_{4w}$ is a spacing between the fourth lens group and the fifth lens group at the wide-angle end,
$d_{4t}$ is a spacing between the fourth lens group and the fifth lens group at the telephoto end,
$f_t$ is a focal length of the zoom lens system at the telephoto end, and
  $f_w$ is a focal length of the zoom lens system at the wide-angle end.

* * * * *

UNITED STATES PATENT AND TRADEMARK OFFICE
CERTIFICATE OF CORRECTION

| | |
|---|---|
| PATENT NO. | : 7,151,637 B2 |
| APPLICATION NO. | : 11/017755 |
| DATED | : December 19, 2006 |
| INVENTOR(S) | : Akiyoshi Tochigi et al. |

It is certified that error appears in the above-identified patent and that said Letters Patent is hereby corrected as shown below:

Column 35, line 11, change "$d_{2it}$ t is a distance" to --$d_{2it}$ is a distance--;

Signed and Sealed this

Seventh Day of August, 2007

JON W. DUDAS
*Director of the United States Patent and Trademark Office*